United States Patent
Lopez et al.

(10) Patent No.: US 9,609,307 B1
(45) Date of Patent: Mar. 28, 2017

(54) METHOD OF CONVERTING 2D VIDEO TO 3D VIDEO USING MACHINE LEARNING

(71) Applicant: LEGEND3D, INC., Carlsbad, CA (US)

(72) Inventors: Anthony Lopez, Carlsbad, CA (US);
Jacqueline McFarland, Carlsbad, CA (US); Tony Baldridge, Carlsbad, CA (US)

(73) Assignee: LEGEND3D, INC., Los Angeles, CA (US)

( * ) Notice: Subject to any disclaimer, the term of this patent is extended or adjusted under 35 U.S.C. 154(b) by 0 days.

(21) Appl. No.: 14/967,939

(22) Filed: Dec. 14, 2015

Related U.S. Application Data

(63) Continuation-in-part of application No. 14/857,704, filed on Sep. 17, 2015, now Pat. No. 9,438,878.

(51) Int. Cl.
*G06K 9/00* (2006.01)
*H04N 13/02* (2006.01)
*H04N 13/00* (2006.01)

(52) U.S. Cl.
CPC ..... *H04N 13/0264* (2013.01); *H04N 13/0018* (2013.01); *H04N 13/0022* (2013.01); *H04N 13/0275* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2,593,925 A | 4/1952 | Sheldon | |
| 2,799,722 A | 7/1957 | Neugebauer | |

(Continued)

FOREIGN PATENT DOCUMENTS

| | | |
|---|---|---|
| DE | 003444353 | 12/1986 |
| EP | 0302454 | 2/1989 |

(Continued)

OTHER PUBLICATIONS

Learning to produce—video, Park et al., Eastman Kodak research Journal of Latex class files, vol. 6, Jan. 2007, pp. 1-11.*

(Continued)

*Primary Examiner* — Jayesh A Patel
(74) *Attorney, Agent, or Firm* — Arc IP Law, PC; Joseph J. Mayo

(57) ABSTRACT

Machine learning method that learns to convert 2D video to 3D video from a set of training examples. Uses machine learning to perform any or all of the 2D to 3D conversion steps of identifying and locating objects, masking objects, modeling object depth, generating stereoscopic image pairs, and filling gaps created by pixel displacement for depth effects. Training examples comprise inputs and outputs for the conversion steps. The machine learning system generates transformation functions that generate the outputs from the inputs; these functions may then be used on new 2D videos to automate or semi-automate the conversion process. Operator input may be used to augment the results of the machine learning system. Illustrative representations for conversion data in the training examples include object tags to identify objects and locate their features, Bézier curves to mask object regions, and point clouds or geometric shapes to model object depth.

14 Claims, 38 Drawing Sheets

(17 of 38 Drawing Sheet(s) Filed in Color)

(56) References Cited

U.S. PATENT DOCUMENTS

| | | |
|---|---|---|
| 2,804,500 A | 8/1957 | Giacoletto |
| 2,874,212 A | 2/1959 | Bechley |
| 2,883,763 A | 4/1959 | Schaper |
| 2,974,190 A | 3/1961 | Fine et al. |
| 3,005,042 A | 10/1961 | Horsley |
| 3,258,528 A | 6/1966 | Oppenheimer |
| 3,486,242 A | 12/1969 | Aronson |
| 3,551,589 A | 12/1970 | Moskoviz |
| 3,558,811 A | 1/1971 | Montevecchio et al. |
| 3,560,644 A | 2/1971 | Petrocelli et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et al. |
| 3,619,051 A | 11/1971 | Wright |
| 3,621,127 A | 11/1971 | Hope |
| 3,647,942 A | 3/1972 | Siegel |
| 3,673,317 A | 6/1972 | Newell et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reifflel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Daike et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka et al. |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,055,939 A | 10/1991 | Karamon et al. |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,243,460 A | 9/1993 | Kornberg |
| 5,252,953 A | 10/1993 | Sandrew |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,363,476 A | 11/1994 | Kurashige et al. |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,649,032 A | 7/1997 | Burt et al. |
| 5,668,605 A | 9/1997 | Nachshon et al. |
| 5,673,081 A | 9/1997 | Yamashita et al. |
| 5,682,437 A | 10/1997 | Okino et al. |
| 5,684,715 A | 11/1997 | Palmer |
| 5,699,443 A | 12/1997 | Murata et al. |
| 5,699,444 A | 12/1997 | Palm |
| 5,717,454 A | 2/1998 | Adolphi et al. |
| 5,729,471 A | 3/1998 | Jain et al. |
| 5,734,915 A | 3/1998 | Roewer |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,777,666 A | 7/1998 | Tanase et al. |
| 5,778,108 A | 7/1998 | Coleman |
| 5,784,175 A | 7/1998 | Lee |
| 5,784,176 A | 7/1998 | Narita |
| 5,808,664 A | 9/1998 | Yamashita et al. |
| 5,825,997 A | 10/1998 | Yamada et al. |
| 5,835,163 A | 11/1998 | Liou et al. |
| 5,841,439 A | 11/1998 | Pose et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,900 A | 11/1999 | Seago |
| 5,990,903 A | 11/1999 | Donovan |
| 5,991,444 A | 11/1999 | Burt et al. |
| 5,999,660 A | 12/1999 | Zorin et al. |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |

(56) References Cited

U.S. PATENT DOCUMENTS

| | | |
|---|---|---|
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |
| 6,119,123 A | 9/2000 | Dimitrova et al. |
| 6,132,376 A | 10/2000 | Hossack et al. |
| 6,141,433 A | 10/2000 | Moed et al. |
| 6,157,747 A | 12/2000 | Szeliski |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |
| 6,226,015 B1 | 5/2001 | Danneels et al. |
| 6,228,030 B1 | 5/2001 | Urbano et al. |
| 6,263,101 B1 | 7/2001 | Klein et al. |
| 6,271,859 B1 | 8/2001 | Asente |
| 6,314,211 B1 | 11/2001 | Kim et al. |
| 6,329,963 B1 | 12/2001 | Chiabrera |
| 6,337,709 B1 | 1/2002 | Yamaashi et al. |
| 6,360,027 B1 | 3/2002 | Hossack et al. |
| 6,363,170 B1 | 3/2002 | Seitz et al. |
| 6,364,835 B1 | 4/2002 | Hossack et al. |
| 6,373,970 B1 | 4/2002 | Dong et al. |
| 6,390,980 B1 | 5/2002 | Peterson et al. |
| 6,404,936 B1 | 6/2002 | Katayama et al. |
| 6,405,366 B1 | 6/2002 | Lorenz et al. |
| 6,414,678 B1 | 7/2002 | Goddar et al. |
| 6,416,477 B1 | 7/2002 | Jago |
| 6,426,750 B1 | 7/2002 | Hoppe |
| 6,429,867 B1 | 8/2002 | Deering |
| 6,445,816 B1 | 9/2002 | Pettigrew |
| 6,456,340 B1 | 9/2002 | Margulis |
| 6,466,205 B2 | 10/2002 | Simpson et al. |
| 6,474,970 B1 | 11/2002 | Caldoro et al. |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,553,184 B1 | 4/2003 | Ando et al. |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amuah |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Amand et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,850,252 B1 | 2/2005 | Hoffberg |
| 6,853,383 B2 | 2/2005 | Duquesnois |
| 6,859,523 B1 | 2/2005 | Jilk et al. |
| 6,919,892 B1 | 7/2005 | Cheiky et al. |
| 6,964,009 B2 | 11/2005 | Samaniego et al. |
| 6,965,379 B2 | 11/2005 | Lee et al. |
| 6,973,434 B2 | 12/2005 | Miller |
| 6,985,187 B2 | 1/2006 | Han et al. |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Connor et al. |
| 7,084,868 B2 | 8/2006 | Farag et al. |
| 7,098,910 B2 | 8/2006 | Petrovic et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,123,263 B2 | 10/2006 | Harvill |
| 7,136,075 B1 | 11/2006 | Hamburg |
| 7,181,081 B2 | 2/2007 | Sandrew |
| 7,190,496 B2 | 3/2007 | Klug et al. |
| 7,254,264 B2 | 8/2007 | Naske et al. |
| 7,260,274 B2 | 8/2007 | Sawhney et al. |
| 7,272,265 B2 | 9/2007 | Kouri et al. |
| 7,298,094 B2 | 11/2007 | Yui |
| 7,308,139 B2 | 12/2007 | Wentland et al. |
| 7,321,374 B2 | 1/2008 | Naske |
| 7,327,360 B2 | 2/2008 | Petrovic et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,355,607 B2 | 4/2008 | Harvill |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,538,768 B2 | 5/2009 | Kiyokawa et al. |
| 7,542,034 B2 | 6/2009 | Spooner et al. |
| 7,558,420 B2 | 7/2009 | Era |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,663,689 B2 | 2/2010 | Marks |
| 7,665,798 B2 | 2/2010 | Hsia et al. |
| 7,680,653 B2 | 3/2010 | Yeldener |
| 7,772,532 B2 | 8/2010 | Olsen et al. |
| 7,852,461 B2 | 12/2010 | Yahav |
| 7,860,342 B2 | 12/2010 | Levien |
| 7,894,633 B1 | 2/2011 | Harman |
| 7,940,961 B2 | 5/2011 | Allen |
| 8,036,451 B2 | 10/2011 | Redert et al. |
| 8,085,339 B2 | 12/2011 | Marks |
| 8,090,402 B1 | 1/2012 | Fujisaki |
| 8,194,102 B2 | 6/2012 | Cohen |
| 8,213,711 B2 | 7/2012 | Tam et al. |
| 8,217,931 B2 | 7/2012 | Lowe et al. |
| 8,320,634 B2 | 11/2012 | Deutsh |
| 8,384,763 B2 | 2/2013 | Tam et al. |
| 8,401,336 B2 | 3/2013 | Baldridge et al. |
| 8,462,988 B2 | 6/2013 | Boon |
| 8,488,868 B2 | 7/2013 | Tam et al. |
| 8,526,704 B2 | 9/2013 | Dobbe |
| 8,543,573 B2 | 9/2013 | Macpherson |
| 8,634,072 B2 | 1/2014 | Trainer |
| 8,644,596 B1 | 2/2014 | Wu et al. |
| 8,698,798 B2 | 4/2014 | Murray et al. |
| 8,907,968 B2 | 12/2014 | Tanaka et al. |
| 8,922,628 B2 | 12/2014 | Bond |
| 2001/0025267 A1 | 9/2001 | Janiszewski |
| 2001/0051913 A1 | 12/2001 | Vashistha et al. |
| 2002/0001045 A1 | 1/2002 | Ranganath et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice |
| 2003/0046656 A1 | 3/2003 | Saxena |
| 2003/0069777 A1 | 4/2003 | Or-Bach |

(56) References Cited

U.S. PATENT DOCUMENTS

| | | |
|---|---|---|
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |
| 2004/0062439 A1 | 4/2004 | Cahill et al. |
| 2004/0181444 A1 | 9/2004 | Sandrew |
| 2004/0189796 A1 | 9/2004 | Ho et al. |
| 2004/0258089 A1 | 12/2004 | Derechin et al. |
| 2005/0088515 A1 | 4/2005 | Geng |
| 2005/0104878 A1 | 5/2005 | Kaye et al. |
| 2005/0146521 A1 | 7/2005 | Kaye et al. |
| 2005/0188297 A1 | 8/2005 | Knight et al. |
| 2005/0207623 A1 | 9/2005 | Liu et al. |
| 2005/0231501 A1 | 10/2005 | Nitawaki |
| 2005/0231505 A1 | 10/2005 | Kaye et al. |
| 2005/0280643 A1 | 12/2005 | Chen |
| 2006/0028543 A1 | 2/2006 | Sohn et al. |
| 2006/0061583 A1 | 3/2006 | Spooner et al. |
| 2006/0083421 A1 | 4/2006 | Weiguo et al. |
| 2006/0143059 A1 | 6/2006 | Sandrew |
| 2006/0159345 A1 | 7/2006 | Clary et al. |
| 2006/0274905 A1 | 12/2006 | Lindahl et al. |
| 2007/0052807 A1 | 3/2007 | Zhou et al. |
| 2007/0236514 A1 | 10/2007 | Agusanto et al. |
| 2007/0238981 A1 | 10/2007 | Zhu et al. |
| 2007/0260634 A1 | 11/2007 | Makela et al. |
| 2007/0279412 A1 | 12/2007 | Davidson et al. |
| 2007/0279415 A1 | 12/2007 | Sullivan et al. |
| 2007/0286486 A1 | 12/2007 | Goldstein |
| 2007/0296721 A1 | 12/2007 | Chang et al. |
| 2008/0002878 A1 | 1/2008 | Meiyappan |
| 2008/0044155 A1 | 2/2008 | Kuspa |
| 2008/0079851 A1 | 4/2008 | Stanger et al. |
| 2008/0117233 A1 | 5/2008 | Mather |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |
| 2008/0225045 A1 | 9/2008 | Birtwistle |
| 2008/0225059 A1 | 9/2008 | Lowe et al. |
| 2008/0226123 A1 | 9/2008 | Birtwistle |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0219383 A1 | 9/2009 | Passmore |
| 2009/0256903 A1 | 10/2009 | Spooner et al. |
| 2009/0290758 A1 | 11/2009 | Ng-Thow-Hing et al. |
| 2009/0297061 A1 | 12/2009 | Mareachen et al. |
| 2009/0303204 A1 | 12/2009 | Nasiri |
| 2010/0026784 A1* | 2/2010 | Burazerovic ........ H04N 13/026 348/46 |
| 2010/0045666 A1 | 2/2010 | Kornmann |
| 2010/0166338 A1 | 7/2010 | Lee |
| 2010/0259610 A1 | 10/2010 | Petersen |
| 2011/0050864 A1 | 3/2011 | Bond |
| 2011/0069152 A1* | 3/2011 | Wang ..................... G06T 7/0081 348/43 |
| 2011/0074784 A1 | 3/2011 | Turner |
| 2011/0096832 A1* | 4/2011 | Zhang ................... G06T 7/0071 375/240.08 |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0039525 A1 | 2/2012 | Tian |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0218382 A1* | 8/2012 | Zass ..................... G06T 7/0051 348/43 |
| 2012/0249746 A1 | 10/2012 | Cornog et al. |
| 2012/0274626 A1 | 11/2012 | Hsieh |
| 2012/0274634 A1* | 11/2012 | Yamada ................ G06T 7/0051 345/419 |
| 2012/0281906 A1 | 11/2012 | Appia |
| 2012/0306849 A1 | 12/2012 | Steen |
| 2012/0306874 A1 | 12/2012 | Nguyen et al. |
| 2013/0044192 A1* | 2/2013 | Mukherjee ......... H04N 13/0029 348/51 |
| 2013/0051659 A1 | 2/2013 | Yamamoto |
| 2013/0063549 A1* | 3/2013 | Schnyder ........... H04N 13/0264 348/36 |
| 2013/0234934 A1 | 9/2013 | Champion et al. |
| 2013/0258062 A1* | 10/2013 | Noh ................... H04N 13/0022 348/47 |
| 2013/0335532 A1 | 12/2013 | Tanaka et al. |

FOREIGN PATENT DOCUMENTS

| | | |
|---|---|---|
| EP | 1187494 | 4/2004 |
| EP | 1719079 | 11/2006 |
| GB | 2487039 A | 11/2012 |
| JP | 60-52190 | 3/1985 |
| JP | 2002123842 | 4/2002 |
| JP | 2003046982 | 2/2003 |
| JP | 2004207985 | 7/2004 |
| KR | 20120095059 | 8/2012 |
| KR | 20130061289 | 11/2013 |
| SU | 1192168 A | 9/1982 |
| WO | 9724000 | 7/1997 |
| WO | 9912127 | 3/1999 |
| WO | 9930280 | 6/1999 |
| WO | 0079781 | 12/2000 |
| WO | 0101348 | 1/2001 |
| WO | 0213143 | 2/2002 |
| WO | 2006078237 | 7/2006 |
| WO | 2007148219 | 12/2007 |
| WO | 2008075276 | 6/2008 |
| WO | 2011029209 | 9/2011 |
| WO | 2012016600 | 2/2012 |
| WO | 2013084234 | 6/2013 |

OTHER PUBLICATIONS

Efficient and high speed—conversion, Somaiya et al., Springer 3DR Express 10.1007, 2013, pp. 1-9.*
Privacy sensitive—Aproach, Fleck et al., Springer, 10.1007/978-0-387-93808-0_37, 2010, pp. 985-1014.*
"Nintendo DSi Uses Camera Face Tracking to Create 3D Mirages", retrieved from www.Gizmodo.com on Mar. 18, 2013, 3 pages.
Noll, Computer-Generated Three-Dimensional Movies, Computers and Automation, vol. 14, No. 11 (Nov. 1965), pp. 20-23.
Noll, Stereographic Projections by Digital Computer, Computers and Automation, vol. 14, No. 5 (May 1965), pp. 32-34.
Australian Office Action issued for 2002305387, dated Mar. 15, 2007, 2 page.
Canadian Office Action, Dec. 28, 2011, App. No. 2,446,150, 4 pages.
Canadian Office Action, Oct. 8, 2010, App. No. 2,446,150, 6 pages.
Canadian Office Action, Jun. 13, 2011, App. No. 2,446,150, 4 pages.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).
Declaration of Barbara Frederiksen in Support of In-Three, Inc's Opposition to Plaintiff's Motion for Preliminary Injunction, Aug. 1, 2005, *IMAX Corporation et al v. In-Three, Inc.*, Case No. CV05 1795 FMC (Mcx). (25 pages).

(56) References Cited

OTHER PUBLICATIONS

Declaration of John Marchioro, Exhibit C, 3 pages, Nov. 2, 2007.
Declaration of Michael F. Chou, Exhibit B, 12 pages, Nov. 2, 2007.
Declaration of Steven K. Feiner, Exhibit A, 10 pages, Nov. 2, 2007.
Di Zhong, Shih-Fu Chang, "AMOS: An Active System for MPEG-4 Video Object Segmentation," ICIP (2) 8: 647-651, Apr. 1998.
E. N. Mortensen and W. A. Barrett, "Intelligent Scissors for Image Composition," Computer Graphics (SIGGRAPH '95), pp. 191-198, Los Angeles, CA, Aug. 1995.
EPO Office Action issued for EP Appl. No. 02734203.9, dated Sep. 12, 2006, 4 pages.
EPO Office Action issued for EP Appl. No. 02734203.9, dated Oct. 7, 2010, 5 pages.
Eric N. Mortensen, William A. Barrett, "Interactive segmentation with Intelligent Scissors," Graphical Models and Image Processing, v.60 n.5, p. 349-384, Sep. 2002.
Exhibit 1 to Declaration of John Marchioro, Revised translation of portions of Japanese Patent Document No. 60-52190 to Hiromae, 3 pages, Nov. 2, 2007.
Gao et al., Perceptual Motion Tracking from Image Sequences, IEEE, Jan. 2001, pp. 389-392.
Grossman, "Look Ma, No Glasses", Games, Apr. 1992, pp. 12-14.
Hanrahan et al., "Direct WYSIWYG painting and texturing on 3D shapes", Computer Graphics, vol. 24, Issue 4, pp. 215-223. Aug. 1990.
Zhong, et al., "Interactive Tracker—A Semi-automatic Video Object Tracking and Segmentation System," Microsoft Research China, http://research.microsoft.com (Aug. 26, 2003).
Indian Office Action issued for Appl. No. 49/DELNP/2005, dated Apr. 4, 2007, 9 pages.
Interpolation (from Wikipedia encyclopedia, article pp. 1-6) retrieved from Internet URL: http://en.wikipedia.org/wiki/Interpolation on Jun. 5, 2008.
IPER, Mar. 29, 2007, PCT/US2005/014348, 5 pages.
IPER, Oct. 5, 2012, PCT/US2011/058182, 6 pages.
International Search Report, Jun. 13, 2003, PCT/US02/14192, 4 pages.
PCT Search Report issued for PCT/US2011/058182, dated May 10, 2012, 8 pages.
PCT Search Report issued for PCT/US2011/067024, dated Aug. 22, 2012, 10 pages.
Izquierdo et al., Virtual 3D-View Generation from Stereoscopic Video Data, IEEE, Jan. 1998, pp. 1219-1224.
Jul. 21, 2005, Partial Testimony, Expert: Samuel Zhou, Ph.D., 2005 WL 3940225 (C.D.Cal.), 21 pages.
Kaufman, D., "The Big Picture", Apr. 1998, http://www.xenotech.com Apr. 1998, pp. 1-4.
Lenny Lipton, "Foundations of the Stereo-Scopic Cinema, a Study in Depth" With and Appendix on 3D Television, 325 pages, May 1978.
Lenny Lipton, Foundations of the Stereo-Scopic Cinema a Study in Depth, 1982, Van Nostrand Reinhold Company.
Machine translation of JP Patent No. 2004-207985, dated Jul. 22, 2008, 34 pg.
Michael Gleicher, "Image Snapping," SIGGRAPH: 183-190, Jun. 1995.
Murray et al., Active Tracking, IEEE International Conference on Intelligent Robots and Systems, Sep. 1993, pp. 1021-1028.
Ohm et al., An Object-Based System for Stereoscopic Viewpoint Synthesis, IEEE transaction on Circuits and Systems for Video Technology, vol. 7, No. 5, Oct. 1997, pp. 801-811.
Optical Reader (from Wikipedia encyclopedia, article p. 1) retrieved from Internet URL: http://en.wikipedia.org/wiki/Optical_reader on Jun. 5, 2008.
Selsis et al., Automatic Tracking and 3D Localization of Moving Objects by Active Contour Models, Intelligent Vehicles 95 Symposium, Sep. 1995, pp. 96-100.
Slinker et al., "The Generation and Animation of Random Dot and Random Line Autostereograms", Journal of Imaging Science and Technology, vol. 36, No. 3, pp. 260-267, May 1992.

Nguyen et al., Tracking Nonparameterized Object Contours in Video, IEEE Transactions on Image Processing, vol. 11, No. 9, Sep. 2002, pp. 1081-1091.
U.S. District Court, C.D. California, *IMAX Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, WL 3940223 (C.D.Cal.), 6 pages.
U.S. District Court, C.D. California, *IMAX* v. *In-Three*, No. 05 CV 1795, 2005, Partial Testimony, Expert: David Geshwind, WestLaw 2005, WL 3940224 (C.D.Cal.), 8 pages.
U.S. District Court, C.D. California, Western Division, *IMAX Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.
U.S. Patent and Trademark Office, Before the Board of Patent Appeals and Interferences, Ex Parte Three-Dimensional Media Group, Ltd., Appeal 2009-004087, Reexamination Control No. 90/007,578, U.S. Pat. No. 4,925,294, Decis200, 88 pages, Jul. 30, 2010.
Yasushi Mae, et al., "Object Tracking in Cluttered Background Based on Optical Flow and Edges," Proc. 13th Int. Conf. on Pattern Recognition, vol. 1, pp. 196-200, Apr. 1996.
PCT ISR, Feb. 27, 2007, PCT/US2005/014348, 8 pages.
PCT ISR, Sep. 11, 2007, PCT/US07/62515, 9 pages.
PCT ISR, Nov. 14, 2007, PCT/US07/62515, 24 pages.
PCT IPRP, Jul. 4, 2013, PCT/US2011/067024, 5 pages.
Weber, et al., "Rigid Body Segmentation and Shape Description from Dense Optical Flow Under Weak Perspective," IEEE Transactions on Pattern Analysis and Machine Intelligence, vol. 19, No. 2, Feb. 1997,pp. 139-143.
Tam et al., "3D-TV Content Generation: 2D-to-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
International Search Report Issued for PCT/US2013/072208, dated Feb. 27, 2014, 6 pages.
International Search Report and Written Opinion issued for PCT/US2013/072447, dated Mar. 13, 2014, 6 pages.
International Preliminary Report on Patentability received in PCT/US2013/072208 on Jun. 11, 2015, 5 pages.
International Preliminary Report on Patentability received in PCT/US2013/072447 on Jun. 11, 2015, 12 pages.
McKenna "Interactive Viewpoint Control and Three-Dimensional Operations", Computer Graphics and Animation Group, The Media Laboratory, pp. 53-56, 1992.
European Search Report Received in PCTUS2011067024 on Nov. 28, 2014, 6 pages.
IPER, May 10, 2013, PCT/US2011/058182, 6 pages.
European Office Action dated Jun. 26, 2013, received for EP Appl. No. 02734203.9 on Jul. 22, 2013, 5 pages.
Zhang, et al., "Stereoscopic Image Generation Based on Depth Images for 3D TV", IEEE Transactions on Broadcasting, vol. 51, No. 2, pp. 191-199, Jun. 2005.
Baraldi, et al., "Motion and Depth from Optical Flow", Lab. Di Bioingegneria, Facolta' di Medicina, Universit' di Modena, Modena, Italy; pp. 205-208, 1989.
Hendriks, et al. "Converting 2D to 3D: A Survey", Information and Communication Theory Group, Dec. 2005.
IPR Petition No. IPR2016-01491 filed in re U.S. Pat. No. 9,286,941 on Jul. 26, 2016.
Yuille, et al "Feature Extraction from Faces Using Deformable Templates", International Journal of Computer Vision, 9:2, Kluwer Academic Publishers, 1992 (13 pages).
Little, et al. "Analysis of Differential and Matching Methods for Optical Flow", Department of Computer Science, University of British Columbia, 1989 (8 pages).

(56) References Cited

OTHER PUBLICATIONS

Parker, et al "Comparison of Interpolating Methods for Image Resampling", IEEE Transactions on Medical Imaging, vol. MI-2, No. 1, Mar. 1983 (9 pages).
Porter, et al. "Compositing Digital Images", Computer Graphics vol. 18, No. 3, dated Jul. 1984 (7 pages).
Declaration of Dr. David Forsyth filed in IPR2016-01491 on Jul. 26, 2016.
IPR Petition No. IPR2016-01243 filed on Jun. 21, 2016 in re U.S. Pat. No. 7,907,793.
Declaration of Rob Schmitt filed in IPR Petition No. IPR2016-01243 of Jun. 21, 2016.
Declaration of Dr. David Forsyth filed in IPR Petition No. IPR2016-01243 of Jun. 21, 2016.
"How do 3D Films Work?" internet article published at www.physics.org/article-questions.asp?id=56, dated Jan. 1, 2010 (2 pages).
S.J. Gortler, et al, "Rendering Techniques 2001", Proceedings of the Eurographics Workshop in London, SpringerWienNewYokr, United Kingdom, Jun. 25-27, 2001, (3 pages).
Sullivan, Matt, "Trick and Treat: Behind the Scenes of the New Nightmare Before Christmas and 3D Movie Revolution", www.popularmechanics.com/technology/gadgets/a3607/4200796/, dated Sep. 30, 2009.
Abstract of "A Novel Method for Semi-Automatic 2D to 3D Video Conversion", Wu, et al, IEEE 978-1-4244-1755-1, 2008, 1 Page.
Abstract of "Converting 2D Video to 3D: An Efficient Path to a 3D Experience", Cao, et al, IEEE 1070-986X, 2011, 1 Page.
International Search Report and Written Opinion Received in (PCT201647164) on Sep. 22, 2016, 9 pages.

\* cited by examiner

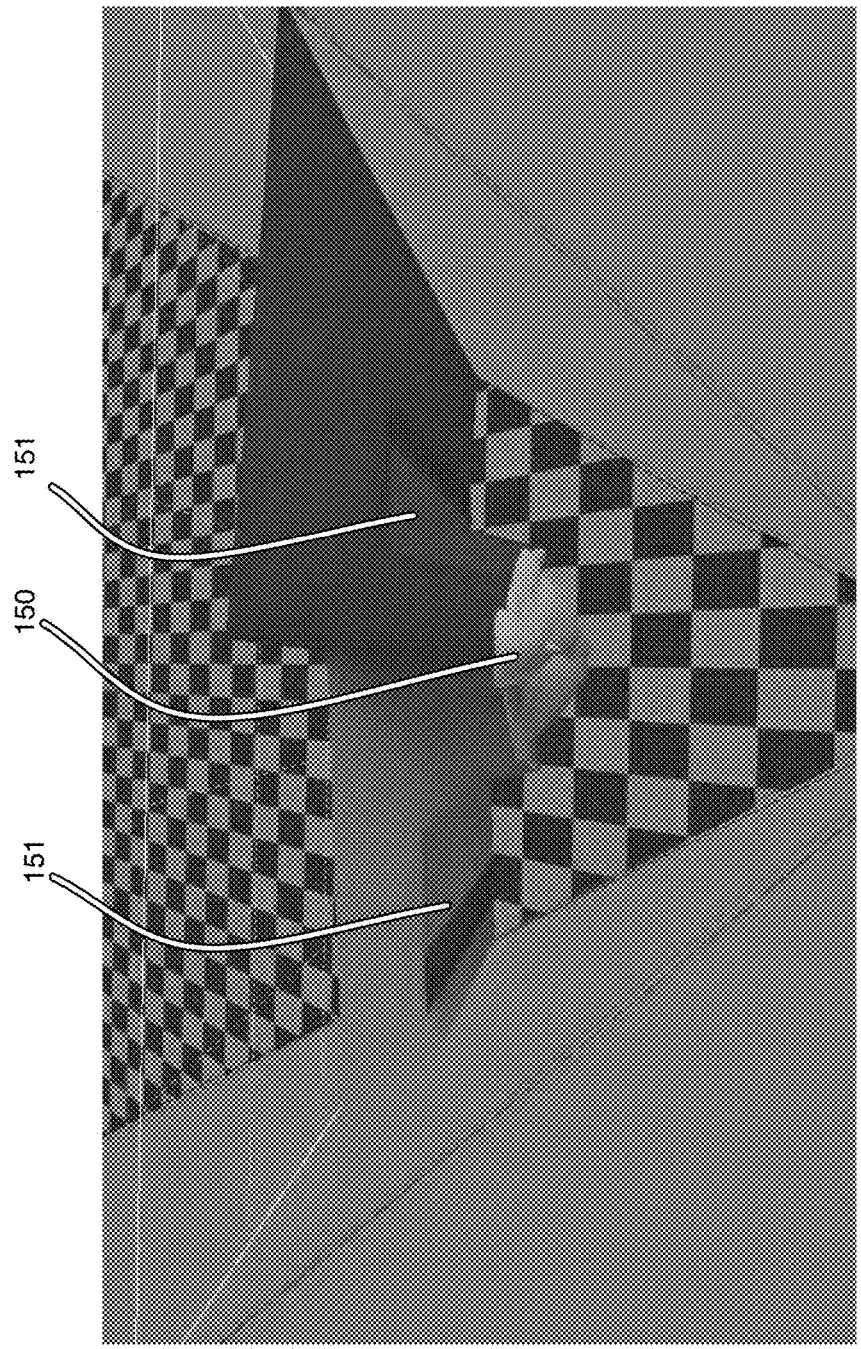

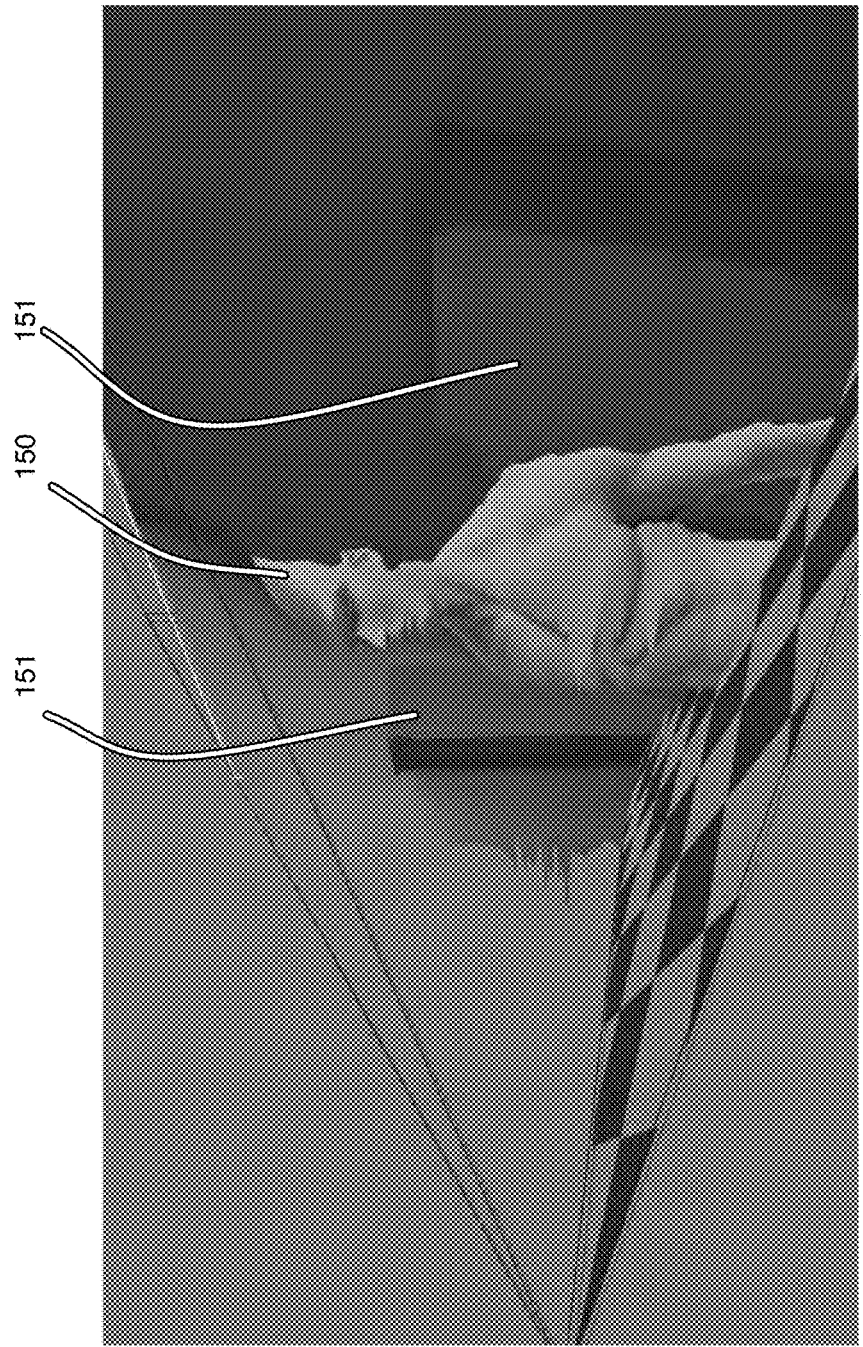

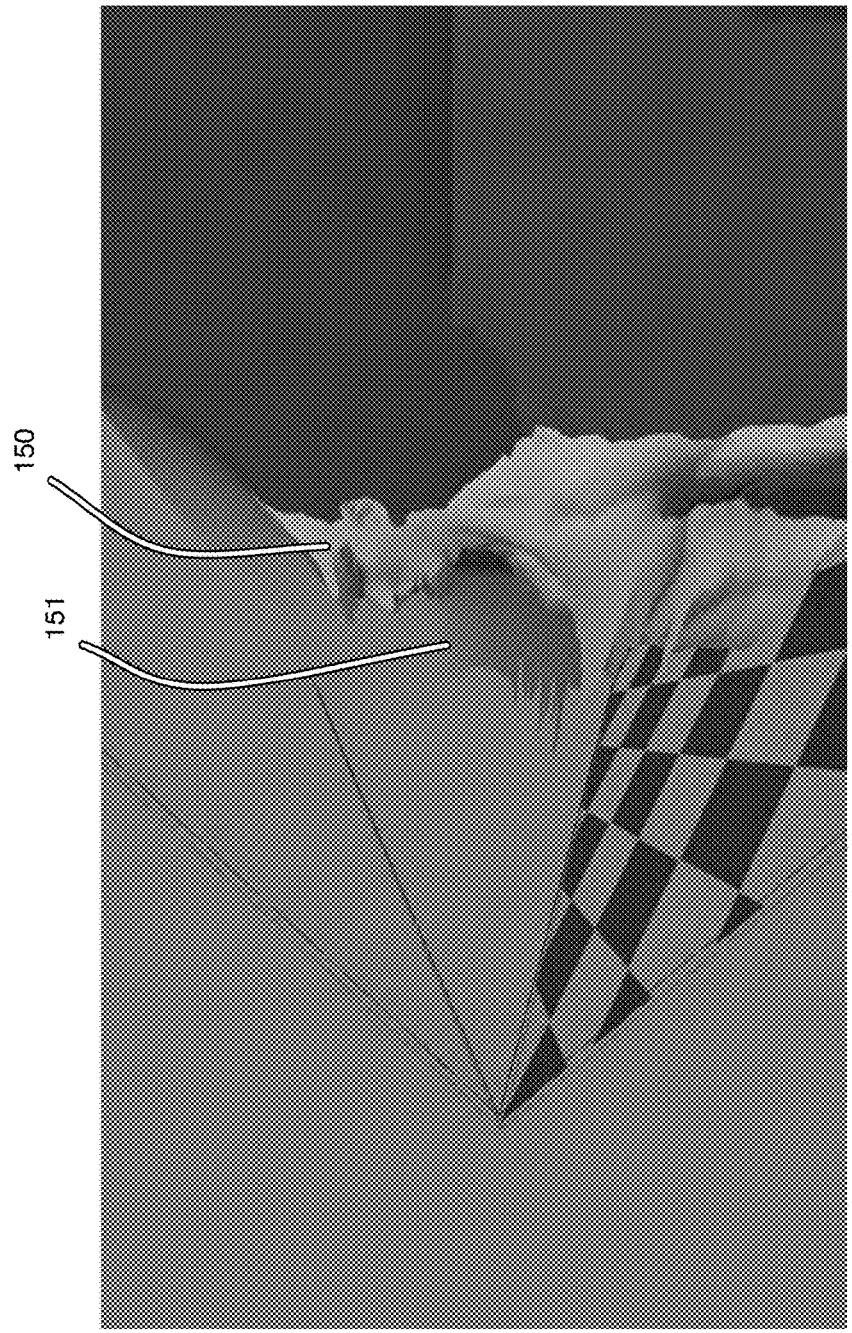

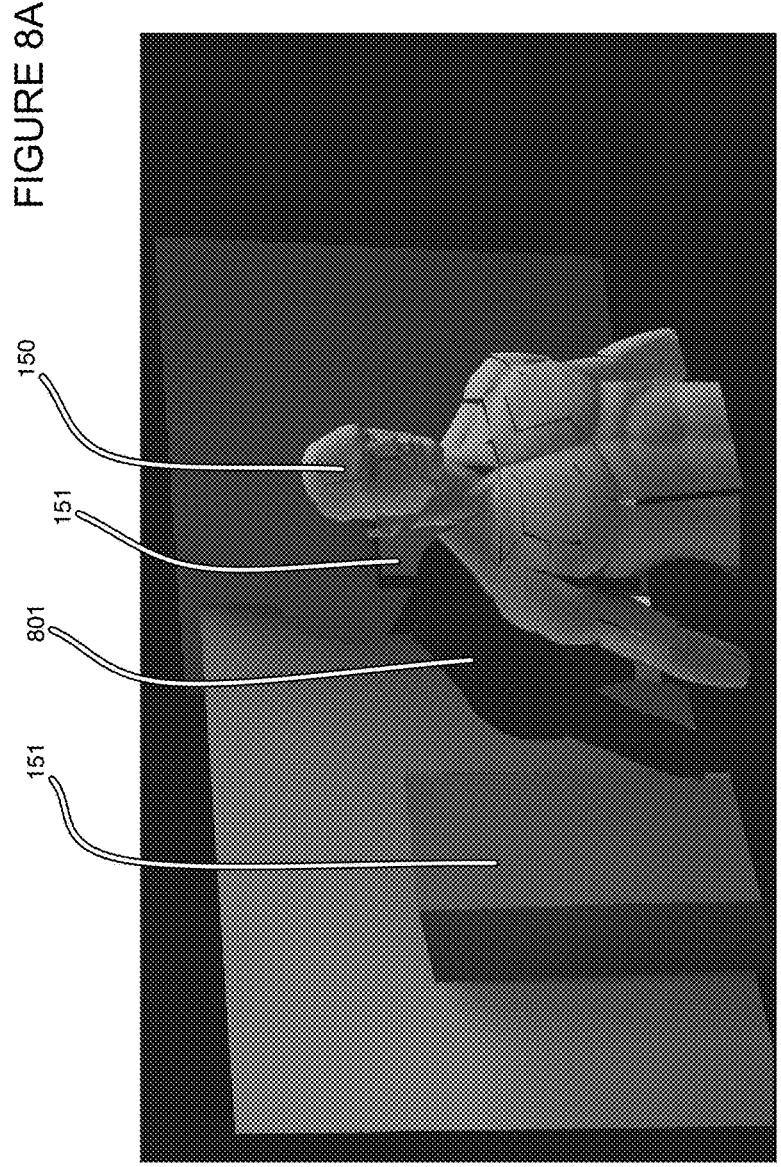

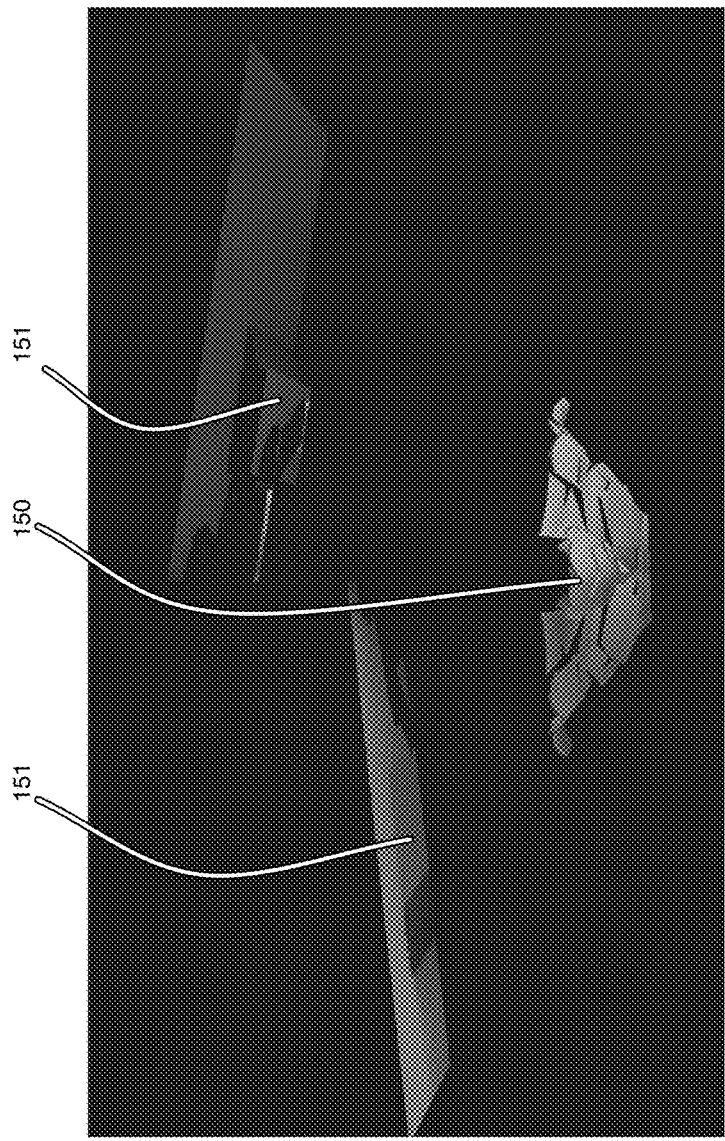

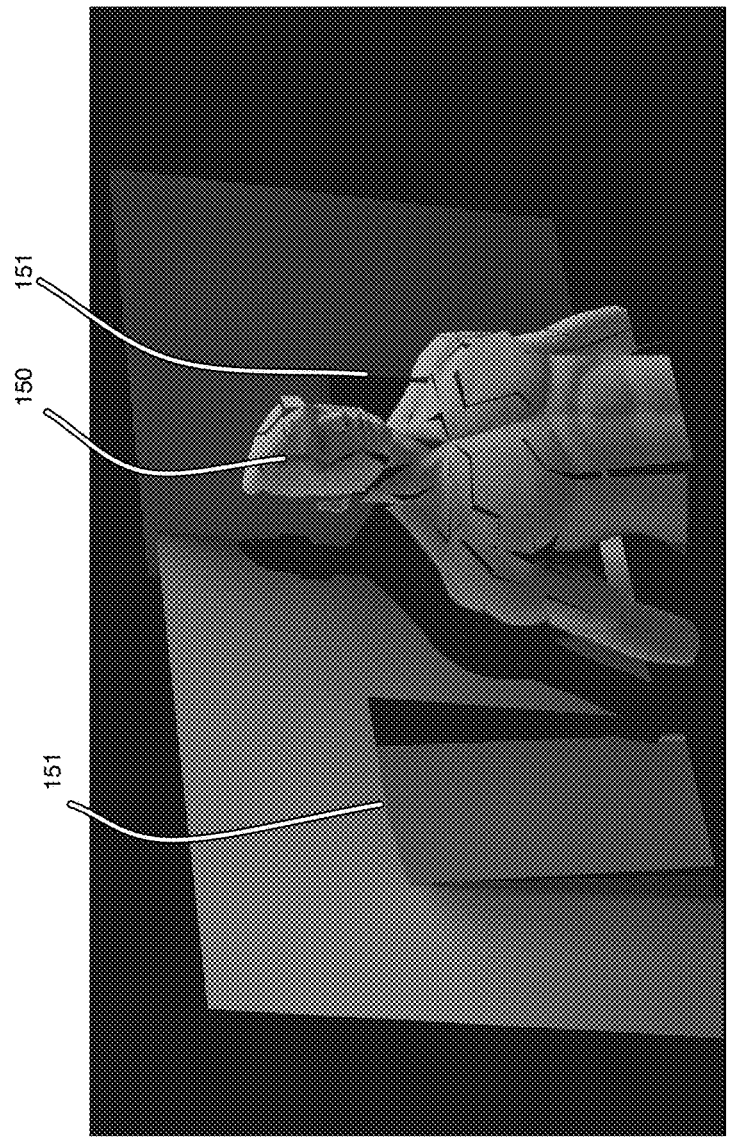

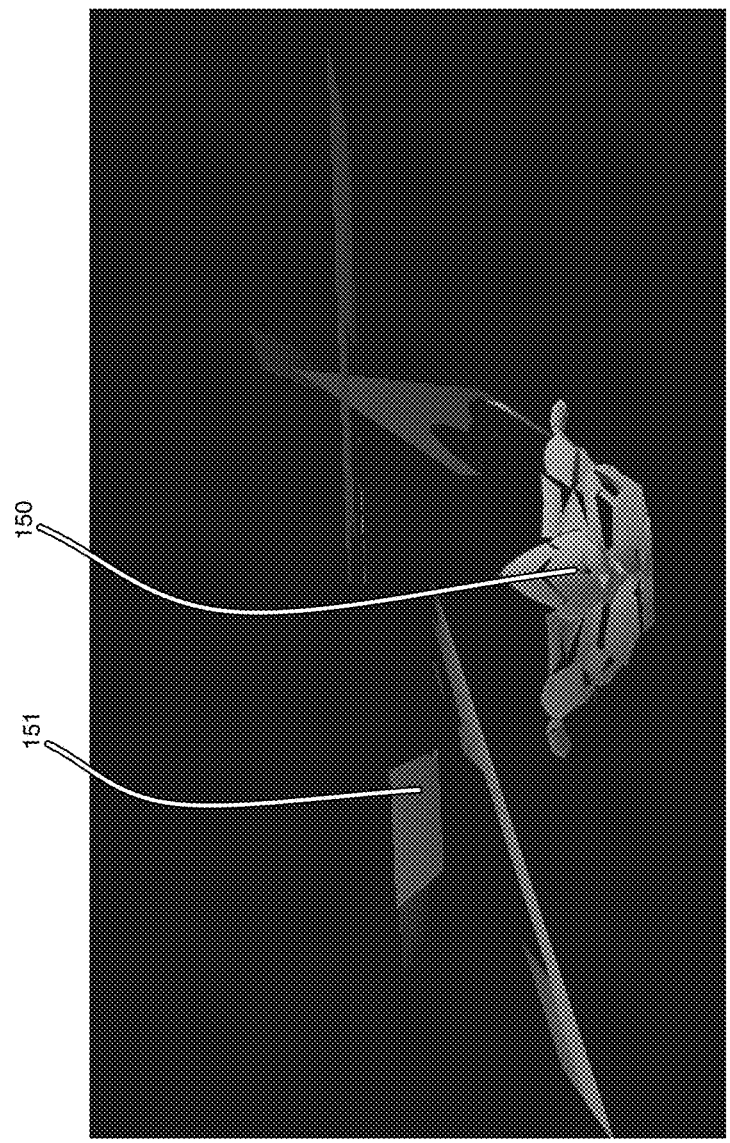

FIG. 15
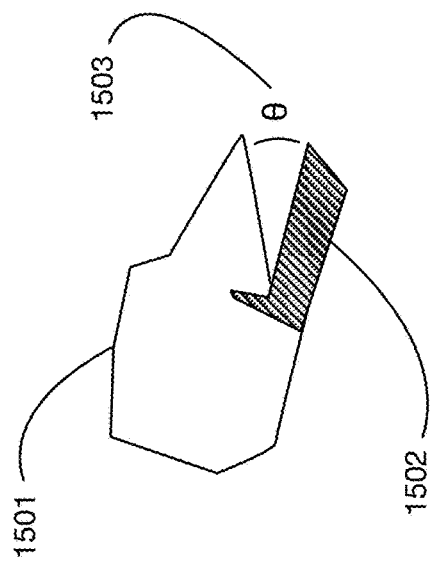
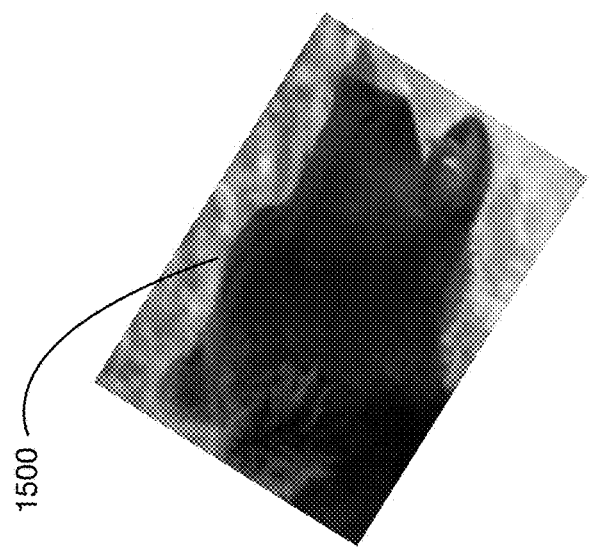

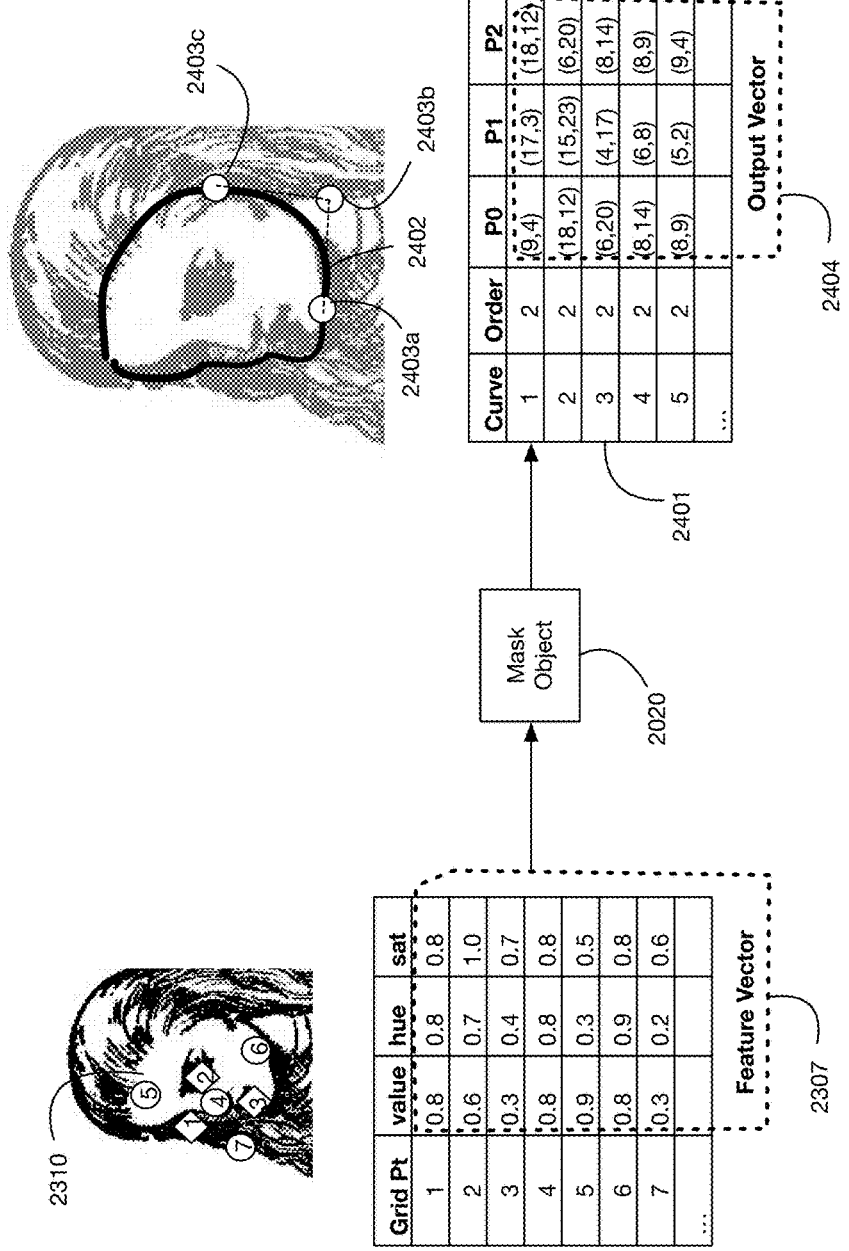

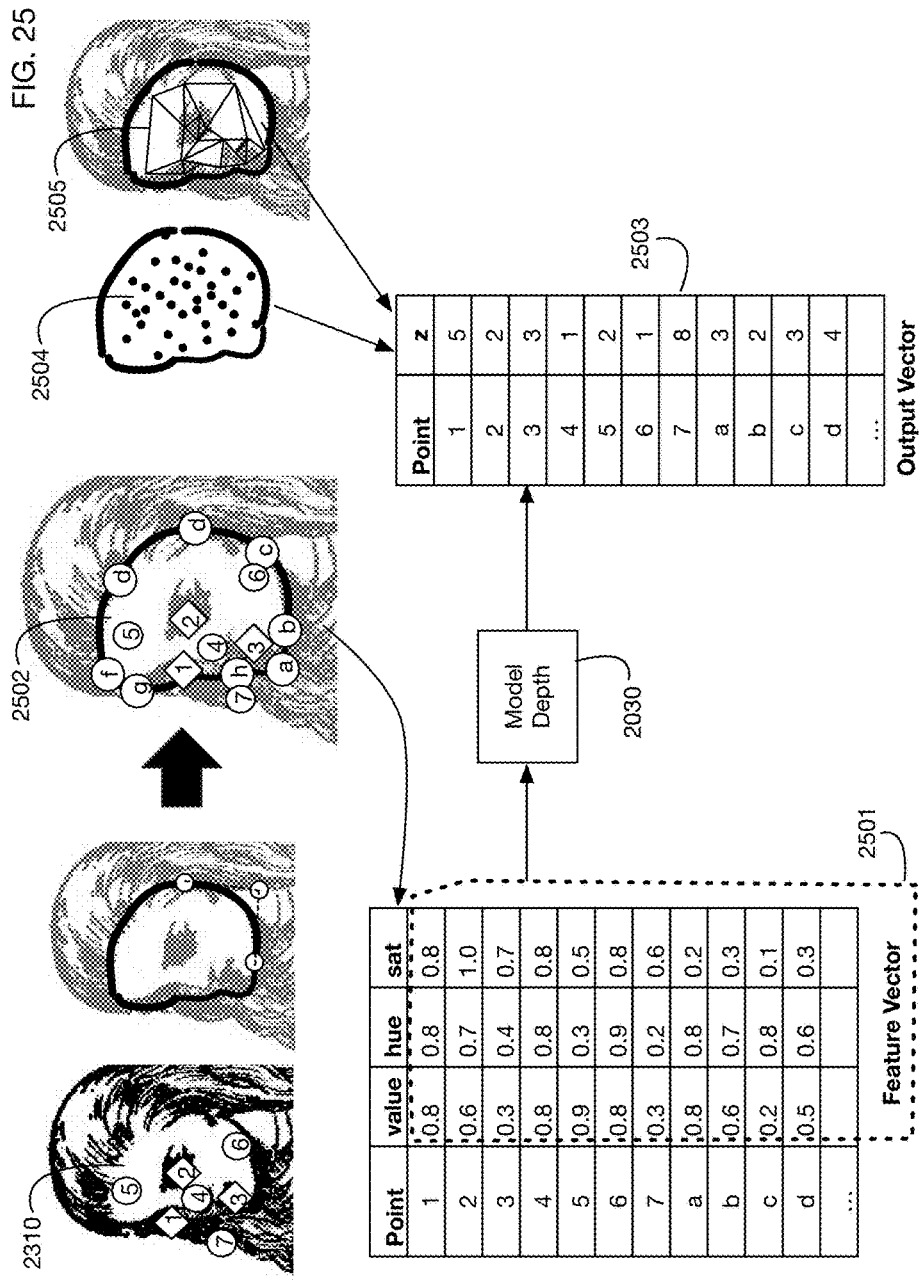

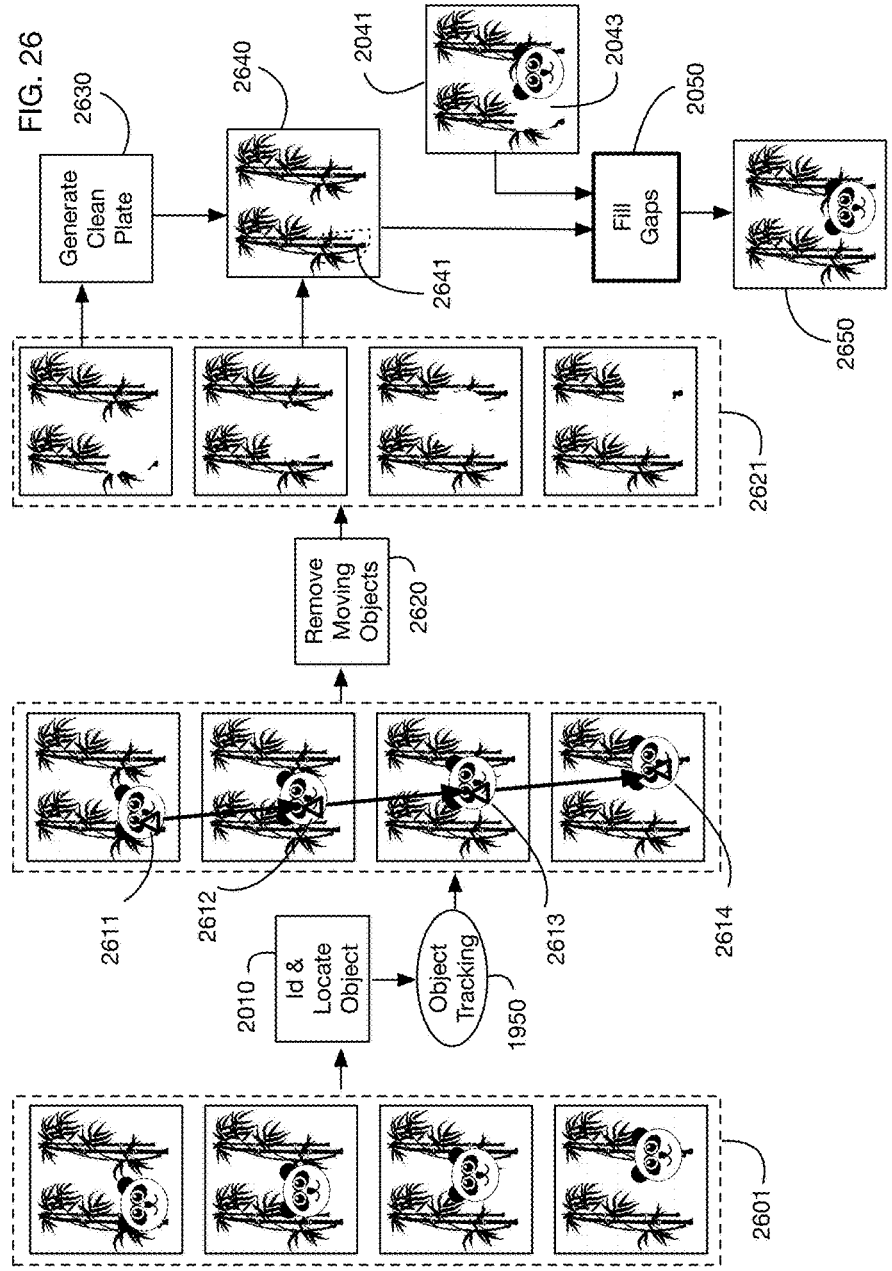

METHOD OF CONVERTING 2D VIDEO TO 3D VIDEO USING MACHINE LEARNING

This application is a continuation in part of U.S. Utility patent application Ser. No. 14/857,704, filed 17 Sep. 2015, the specification of which is hereby incorporated herein by reference.

BACKGROUND OF THE INVENTION

Field of the Invention

One or more embodiments of the invention are related to the field of image processing. More particularly, but not by way of limitation, one or more embodiments of the invention enable a method of converting 2D video to 3D video using machine learning. Embodiments of the invention train a machine learning system to perform one or more 2D to 3D conversion steps. The machine learning system is trained on a training set that includes 2D to 3D conversion examples; it derives generalized 2D to 3D transformation functions from this training set. Embodiments of the invention may also obtain 3D models of objects, such as characters, and process the frames of a video to locate and orient these models in the frames. Depth maps and stereoscopic 3D video may then be generated from the 3D models. Embodiments of the invention may convert 3D scanner data to a set of rotated planes associated with masked areas of the data, thus forming a 3D object model. This enables the planes to be manipulated independently or as part of a group, and eliminates many problems associated with importing external 3D scanner data including minimization of errors that frequently exist in external 3D scanner data.

Description of the Related Art

Two-dimensional images contain no depth information and hence appear the same to an observer's left and right eye. Two-dimensional images include paper photographs or images displayed on a standard computer monitor. Two-dimensional images however may include shading and lighting that provide the observer a sense of depth for portions of the image, however, this is not considered a three-dimensional view of an image. Three-dimensional images on the other hand include image information that differs for each eye of the observer. Three-dimensional images may be displayed in an encoded format and projected onto a two-dimensional display. This enables three-dimensional or stereoscopic viewing for example with anaglyph glasses or polarized glasses. Other displays may provide different information based on the orientation with respect to the display, e.g., autostereoscopic displays that do not require special glasses for viewing three-dimensional images on a flat two-dimensional display. An example of such as display is a lenticular display. Alternatively, two images that are shown alternately to the left and right eyes may be viewed with shutter glasses. Regardless of the type of technology involved, conversion of two-dimensional images to stereoscopic images requires the addition of depth information to the two-dimensional input image.

Current solutions for conversion of two-dimensional images to stereoscopic images generally require large amounts of manual labor for highly accurate results. These manual masking systems generally operate by accepting manually created masks in order to define areas or regions in the image that have different depths and which generally represent different human observable objects. Depth information is then accepted by the system as input from artists for example, which results in nearer objects being shifted relatively further horizontally to produce left and right eye viewpoints or images, or Red/Blue anaglyph single image encodings, either of which may be utilized for stereoscopic viewing. By shifting objects in the foreground, hidden or background information may be exposed. If the missing image data is not shown in any other images in a scene, then the "gap" must be filled with some type of image data to cover the artifact. If the hidden image data does not exist in any other image in a scene, then this prohibits borrowing of pixels from the areas in other images that do contain the missing information. Various algorithms exist for filling gaps, which are also known as occlusion filling algorithms, to minimize the missing information with varying success. Generally, the depth artist gains visual clues from the image and applies depth to masks using artistic input.

The 2D to 3D conversion processes described above require large amount of manual labor. There are no known systems that automate the conversion process. However, because some organizations have performed hundreds or thousands of 2D to 3D conversions, there is a considerable database of conversion examples. In principle, machine learning techniques can be applied to develop generalized 2D to 3D conversion methods from such a historical database of conversion examples. Machine learning techniques are known in the art, but they have not been applied to 2D to 3D conversion. There are no known systems that apply machine learning techniques to develop 2D to 3D conversion methods using a database of conversion examples.

For at least the limitations described above there is a need for a method to convert 2D video to 3D video using machine learning.

BRIEF SUMMARY OF THE INVENTION

One or more embodiments described in the specification are related to a method of converting of 2D video to 3D video using 3D object models that provides increased artistic and technical flexibility and rapid conversion of movies for stereoscopic viewing. Embodiments of the invention convert a large set of highly granular depth information inherent in a depth map associated with a two-dimensional image to a smaller set of rotated planes associated with masked areas in the image. This enables the planes to be manipulated independently or as part of a group and eliminates many problems associated with importing external depth maps including minimization of errors that frequently exist in external depth maps Embodiments of the invention may utilize any type of depth map including Z-Depth associated with images that are generated through rendering from a Computer Generated Imagery or CGI application such as MAYA® or HOUDINI®, depth maps obtained after conversion of a disparity map from a stereoscopic pair of images to a Z-Depth, Z-Depth extraction from of a light-field image, time-of-flight imaging systems, LIDAR, or any other type of depth map associated with a two-dimensional image.

Embodiments of the invention include a number of inherent advantages over simply using the Z-Depths as is currently performed in automated or semi-automated 2D to 3D conversion processes.

For example, embodiments of the invention transform the large set of depth map depths or Z-Depth into a manageable number of parts. Thus, the system enables an artist to manipulate individual or groups of parts for artistic purposes, as opposed to pixel-by-pixel editing. So, for example, an artist may independently adjust the angle, and hence depth of a robot's arm so the resulting stereoscopic image appears to reach out of the screen.

In addition, by transforming the Z-Depth into a manageable number of parts, the system enables an artist to group these parts and apply separate RGB image layers to these groups. This enables more efficient occlusion filling in the 2D to 3D conversion workflow.

Furthermore, embodiments of the invention mold depth data to eliminate depth errors by transforming large numbers of depth values to smaller number of plane rotations. In one embodiment, the system may calculate the normal and position for a specific region, for example to form an average, rotation value associated with a plane that represents a large group of depth values, some of which may be erroneous. Hence, issues associated with imperfect depth map data are often averaged out, or otherwise eliminated. In some extreme cases of noisy depth data, these issues may not be fully resolved, however, embodiments of the invention reduce the problem to a manageable number of editable parts, and enable the issues to be rapidly and easily corrected automatically or by accepting inputs from an artist. One or more embodiments of the invention may utilize a normal vector algorithm. Other algorithms may be utilized alone or in combination with the normal vector method to achieve similar or advantageous results. For example, embodiments of the invention may treat each pixel as a point in space, e.g., wherein X and Y represent the position of the pixel and Z represents the Z-Depth value of that pixel, and isolate only the points within the defined region, and calculate the "best-fit" plane for that group of points, and/or a normal vector representation of the plane. The normal vector in this embodiment is orthogonal to the plane and may be encoded into separate RGB channels in order to provide a viewable representation of the planar angles with respect to the optical display. Embodiments of the invention may utilize any type of plane fitting algorithm including, but not limited to, regression plane, orthogonal distance regression plane, etc. Embodiments of the invention may utilize any type of filtering as part of the transformation processing including but not limited to dilation and erosion.

One or more embodiments of the invention implement a method on a computer for example wherein the method includes obtaining an external depth map associated with a two-dimensional image, obtaining at least one mask associated with at least one area within the two-dimensional image, calculating a fit or best fit for a plane using a computer based on depth associated with the at least one area associated with each of the at least one mask, applying depth associated with the plane having the fit to the at least one area to shift pixels in the two-dimensional image horizontally to produce a stereoscopic image or stereoscopic image pair.

Embodiments of the method may also include obtaining of the external depth map associated with a two-dimensional image by obtaining a disparity map, or a depth map of lower resolution than the two-dimensional image from a pair of witness cameras, or a depth map from time-of-flight system, or a depth map from a triangulation system.

Embodiments of the invention may also include obtaining at least one mask associated with at least one area within the two-dimensional image by automatically generating the at least one mask comprising the at least one area wherein the at least one area is over a predefined size and within a predefined depth range, or automatically generating the at least one mask comprising the at least one area wherein the at least one area comprises a boundary having a difference in luminance values over a predefined threshold, or both methods of size, depth range and boundary or any combination thereof.

Embodiments of the invention may also include calculating the best fit for a plane using a computer based on depth associated with the at least one area associated with each of the at least one mask by calculating a normal vector for the plane, or a regression fit for the plane, or an orthogonal distance regression fit for the plane, or in any other known manner regarding fitting a plane to particulars points in three-dimensional space.

Embodiments of the invention generally also include applying depth associated with the plane having the best fit to the at least one area to shift pixels in the two-dimensional image horizontally to produce a stereoscopic image or stereoscopic image pair.

Embodiments may also include grouping two or more of the planes in order to provide a piecewise masked surface area. The grouping may include a link of a predefined minimum and maximum distance, which enables moving one plane to move other grouped planes if the maximum values are hit. The minimum values may be zero or negative to allow to precise joining of planes or slight overlap for example. In one or more embodiments, the grouping may include a link having a spring constant, this enables the movement of planes relative to one another to self align with respect to the other planes to minimize the overall spring force on three or more of the corner points of the plane. Alternatively or in combination, embodiments of the invention may include altering automatically any combination of position, orientation, shape, depth or curve of said plane in order to fit edges or corners of the plane with another plane. This enables a plane to be positioned in three-dimensional space, rotated in three-dimensions, reshaped by moving a corner point, warped in effect by adding depth or a curve to the plane, for example to add depth to the plane itself to match the underlying image data. Embodiments of the invention may also include accepting an input to alter any combination of position, orientation, shape, depth or curve of the plane, for example to artistically fit the underlying image data, correct errors or artifacts from the automated fitting process for touch up, etc.

One or more embodiments of the invention use one or more 3D object models to convert all or portions of a 2D video to a 3D video. A 3D object model may be obtained from any source and in any format for any object or objects that appear in one or more frames of a 2D video. For a scene of the 2D video containing the object, a 3D space may be defined for example with coordinate axes for the location of the scene. A 3D object model may then be positioned and oriented in this 3D space for each frame in which the corresponding object appears. From this positioned and oriented 3D object model, a depth map for the object in the frame may be generated. Embodiments may augment the depth map with depth information for other elements in the frame. A stereoscopic image pair may then be generated from the depth map and from the 2D frame using techniques known in the art for 2D to 3D conversion.

One or more embodiments may obtain 3D scanner data for an object, and convert this scanner data into a 3D model for the object. 3D data may be obtained using any 3D scanning technology, including for example laser systems using time-of-flight or triangulation, or systems using structured light fields. 3D data may be obtained from stereo cameras or systems with witness cameras. Any technique for obtaining 3D data describing an object is in keeping with the spirit of the invention.

Conversion of 3D data to a 3D object model may for example include retopologizing the 3D data to a lower polygon count model or to a model with parameterized surfaces. One or more embodiments may use retopologizing techniques to reduce model complexity. Conversion may for example include fitting one or more planes to the 3D data and generating a 3D object model from these planes. Any of the techniques described above for fitting and adjusting planes or other surfaces may be used in one or more embodiments to generate a 3D object model. For example, one or more planes may be defined using regression fit, orthogonal distance regression fit, or calculation of normal vectors to the planes. One or more embodiments may combine multiple planes into groups of planes with links between the planes; links may for example define constraints between the edges or corners of the planes. One or more embodiments may employ link constraints that define maximum or minimum values for distances or angles. One or more embodiments may employ link constraints that use spring constants for the links and that for example minimize a potential energy of the model using the spring constants. One or more embodiments may define masks for selected areas of the model, using for example areas of predefined size or predefined depth, or areas with boundaries determined by changes in luminance or other image features over predefined thresholds.

One or more embodiments may adjust the planes or surfaces fit to 3D data, for example by altering one or more of position, orientation, shape, depth or curve of the more planes in order to fit edges or corners of said the planes with one another. Adjustments may be made manually or may be made automatically using a computer. The adjusted planes or surfaces may be used to generate a 3D object model.

One or more embodiments may locate and orient a 3D model in a frame using one or more model features. Features on the 3D object model may be aligned with pixel locations in the frame, and the 3D object model position and orientation in the 3D space of the scene may be calculated using techniques known in the art to minimize errors between observed pixel coordinates and the projection of the 3D feature points onto the image plane. One or more embodiments may align 3D object models with images in a frame in one or more key frames, and automatically determine the alignment in non-key frames using automated feature tracking.

In one or more embodiments one or more objects may be non-rigid in that they comprise multiple parts that may move relative to one another. One or more embodiments may generate or obtain rigged 3D object models with degrees of freedom between the parts of the models. Locating and orienting these rigged models in frames may include determining values for the degrees of freedom of the rigged models. These values may be determined manually, automatically, or using a combination of manual and automated techniques. One or more embodiments may determine the location and orientation of each part of a rigged 3D object model by aligning features of the parts with pixels in an image of the object in a frame. Values for degrees of freedom may be interpolated automatically between key frames. One or more embodiments may manually locate and orient an object and define values for degrees of freedom in key frames, and may use feature tracking to automatically determine the object location and orientation and the values of the degrees of freedom in non-key frames.

One or more embodiments of the invention use machine learning for conversion of 2D video to 3D video. A machine learning system may be trained on a training set comprising conversion examples. A conversion example describes the conversion of a 2D scene to 3D. It may for example contain a 3D conversion dataset that includes the inputs and outputs from one or more 2D to 3D conversion steps. 2D to 3D conversion steps may include, for example locating and identifying one or more objects in one or more 2D frames, generating object masks for these objects, generating depth models for these objects, generating a stereoscopic image pair for each 2D frame, and filling gaps in the image pair with pixel values for the missing pixels. A machine learning system may learn to perform any or all of these steps using the training set to develop the machine learning algorithms and functions. The machine learning system may then be used to perform 2D to 3D conversion on a new 2D video. In one or more embodiments some 2D to 3D conversion steps may be performed automatically by a machine learning system; other steps may be performed, completed, or modified by an operator.

One or more embodiments may use machine learning to perform object masking. For example, a 3D conversion dataset associated with a conversion example in the training set may include a masking input and a masking output. The masking input may include, for example, an object identity and a location of one or more feature points of the object in one or more frames. The masking output may include, for example, a path defining a boundary of a masked region for the object. The path may comprise, for example, one or more segments, each of which may be a curve defined by one or more control points. The machine learning system may learn a function that maps these masking inputs to these masking outputs.

One or more embodiments may use machine learning to generate an object depth model. For example, a 3D conversion dataset associated with a conversion example in the training set may include an object depth model input, and an object depth model output. The object depth model input may include, for example, an object mask. The corresponding output may include any information that assigns depth to one or more points within the mask. For example, an object depth model output may include a 3D point cloud giving 3D coordinates for points within the mask. An object depth model output may include a geometric model comprising regions within the mask, and associating each region with a planar or curved surface in 3D space. The machine learning system may learn a function that maps object depth model inputs, such as a mask, into the corresponding object depth model outputs.

One or more embodiments may use machine learning to perform gap filling. One method of gap filling used by one or more embodiments is to generate a clean plate frame from one or more 2D frames, and to use pixels from the clean plate frame to fill missing pixels. A 3D conversion dataset associated with a conversion example in the training set may include a clean plate input and a clean plate output. The clean plate input may include for example a series of 2D frames; collectively these frames may contain all of the clean plate pixels, but the machine learning system needs to learn how to extract them from the individual frames. The clean plate output may include the clean plate frame. The machine learning system may learn a function that maps 2D frames into the corresponding clean plate frame.

One or more embodiments may use machine learning to perform all of the steps of object masking, object depth modeling, and clean plate generation for gap filling.

One or more embodiments may use a 3D object model to perform object masking, object depth modeling, or both. A 3D object model may be obtained, for example, from 3D scanner data. One or more embodiments may combine machine learning methods with the use of 3D object models to perform 2D to 3D conversion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIGS. 7A-C illustrates a perspective, side and top view of perfect error-free depth applied to the two-dimensional input image. FIGS. 7D-F illustrates a perspective, side and top view of imperfect typical depth having errors and acquired from an external depth capture apparatus or system and applied to the two-dimensional input image.

FIGS. 8A-C illustrates a perspective, side and top view of perfect error-free depth applied to planes and/or masks of areas or regions associated with the two-dimensional input image. FIGS. 8D-F illustrates a perspective, side and top view of imperfect typical depth acquired from an external depth capture apparatus or system and applied to planes and/or masks of areas or regions associated with to the two-dimensional input image.

FIG. 15 illustrates an embodiment of a 3D object model that has been rigged with a degree of freedom for a moveable joint.

FIG. 24 illustrates a machine learning method to learn a mapping between the feature vector of FIG. 23 and an object mask defined by Bézier curves.

FIG. 25 illustrates a machine learning method to learn a mapping between pixel values within an object mask and depth assignments to those pixels; example depth values may be obtained for example from a 3D point cloud or from a geometric model.

FIG. 26 illustrates a machine learning method to learn a mapping between a series of 2D frames and a clean plate frame containing the background for those frames.

DETAILED DESCRIPTION OF THE INVENTION

A method for converting 2D video to 3D video using machine learning will now be described. In the following exemplary description numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
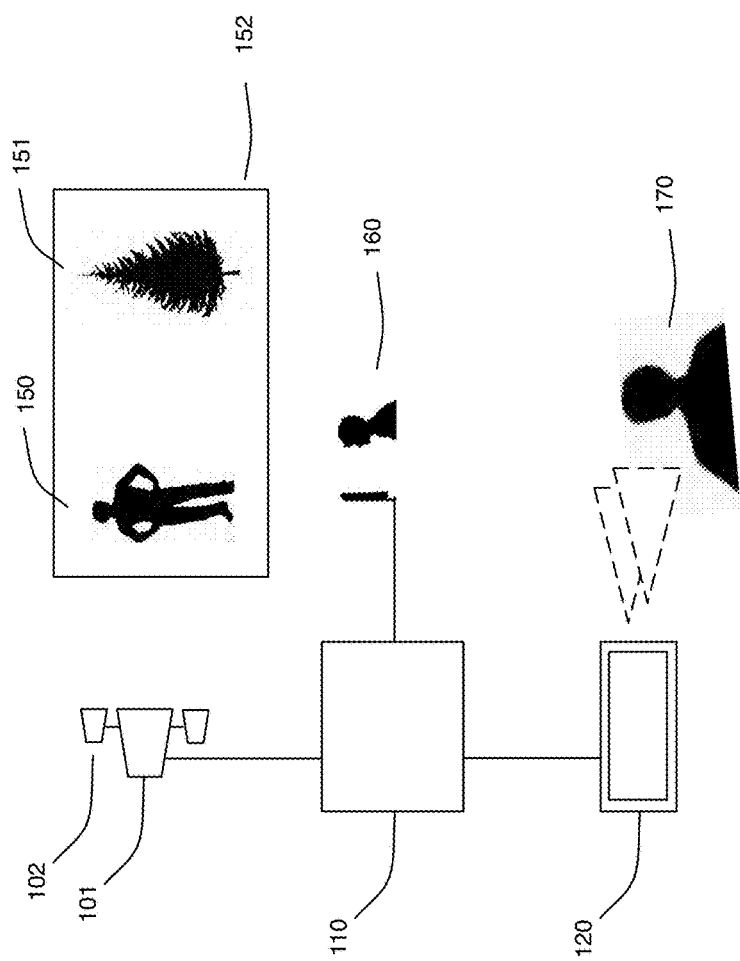
FIG. 1 illustrates an exemplary overall system architecture for one or more embodiments of the invention.

FIG. 1 illustrates an exemplary overall system architecture for one or more embodiments of the invention. As shown, camera 101 and associated external depth capture apparatus 102, e.g., a single apparatus such as a light-field or time-of-flight apparatus, or as shown with two side mounted witness cameras for example, are utilized to capture images and depth values associated with foreground object 150, background object 151 in scene 152. Generally, multiple images are captured at fixed points in time to obtain a movie. Other embodiments may utilize depth captured from or input via other systems not directly coupled with camera 101, including computer generated depths associated with computer-animated characters or objects, external LIDAR, plenoptic camera or any other external depth capture apparatus for example. Embodiments of the system generally include a computer such as server 110 that enables artist(s) 160 to apply and/or correct depth for example as obtained from the external depth capture apparatus 102 or any other external source of depth. Embodiments of the server are generally utilized to obtain masks associated with areas within the foreground object 150, background object 151 or elsewhere in the scene 152. The masks may be automatically generated or accepted by the server for example by artist 160. The server may automatically calculate a fit for planes or masks associated with areas of the images or accept inputs to alter the fit from artist 160 for example. The system may optionally also automatically alter the position, orientation, shape, depth or curve of planes or masks to fit the edges of the planes or masks with other planes or masks for example. Embodiments apply the depth of the planes or masks to the areas in the image to produce a stereoscopic image, e.g., anaglyph, or stereoscopic image pair for display on visual output 120 by viewer 170.

Figure 2:
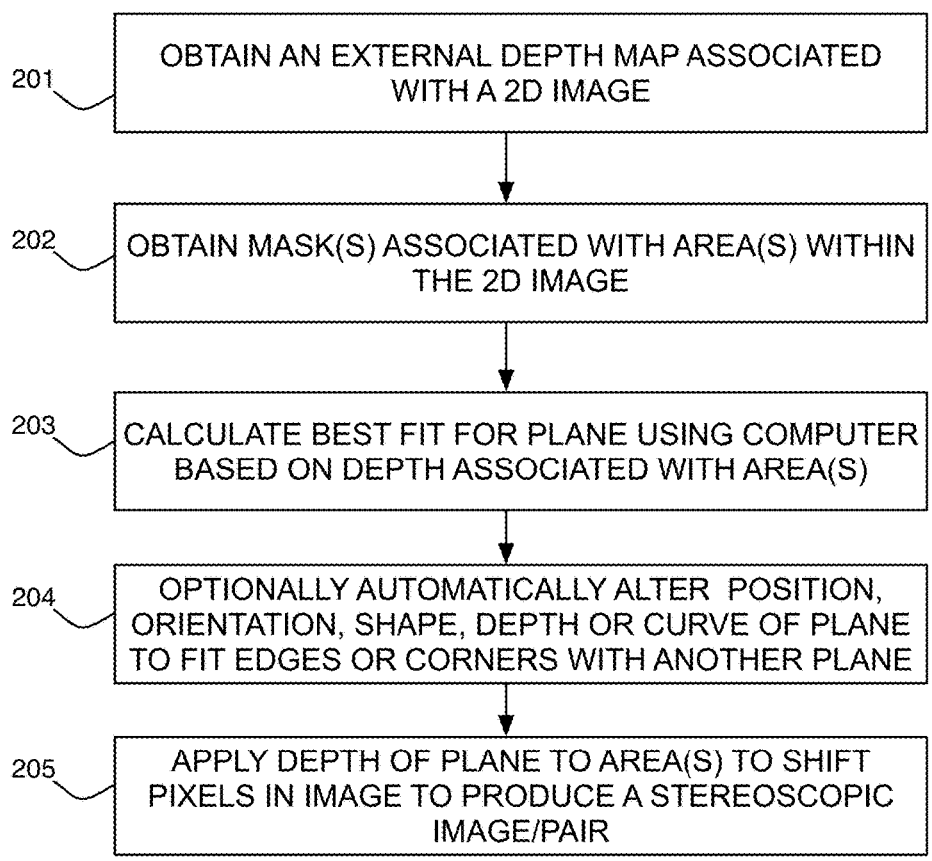
FIG. 2 illustrates a flow chart for an embodiment of the method of the invention.

FIG. 2 illustrates a flow chart for an embodiment of the method of the invention wherein the method includes obtaining an external depth map associated with a two-dimensional image at 201, obtaining at least one mask associated with at least one area within the two-dimensional image at 202, calculating a fit or best fit for a plane using a computer based on depth associated with the at least one area associated with each of the at least one mask at 203, optionally, embodiments of the method may also automatically alter the position, orientation, shape, depth or curve of planes or masks to fit the edges of the planes or masks with other planes or masks for example at 204, applying depth associated with the plane having the fit to the at least one area to shift pixels in the two-dimensional image horizontally to produce a stereoscopic image or stereoscopic image pair at 205. One or more embodiments thus enable an external depth map transformation method of converting two-dimensional images to stereoscopic images that provides increased artistic and technical flexibility and rapid conversion of movies for stereoscopic viewing. Embodiments of the invention convert a large set of highly granular depth information inherent in a depth map associated with a two-dimensional image to a smaller set of rotated planes associated with masked areas in the image. This enables the planes to be manipulated independently or as part of a group and eliminates many problems associated with importing external depth maps including minimization of errors that frequently exist in external depth maps.

Figure 3:
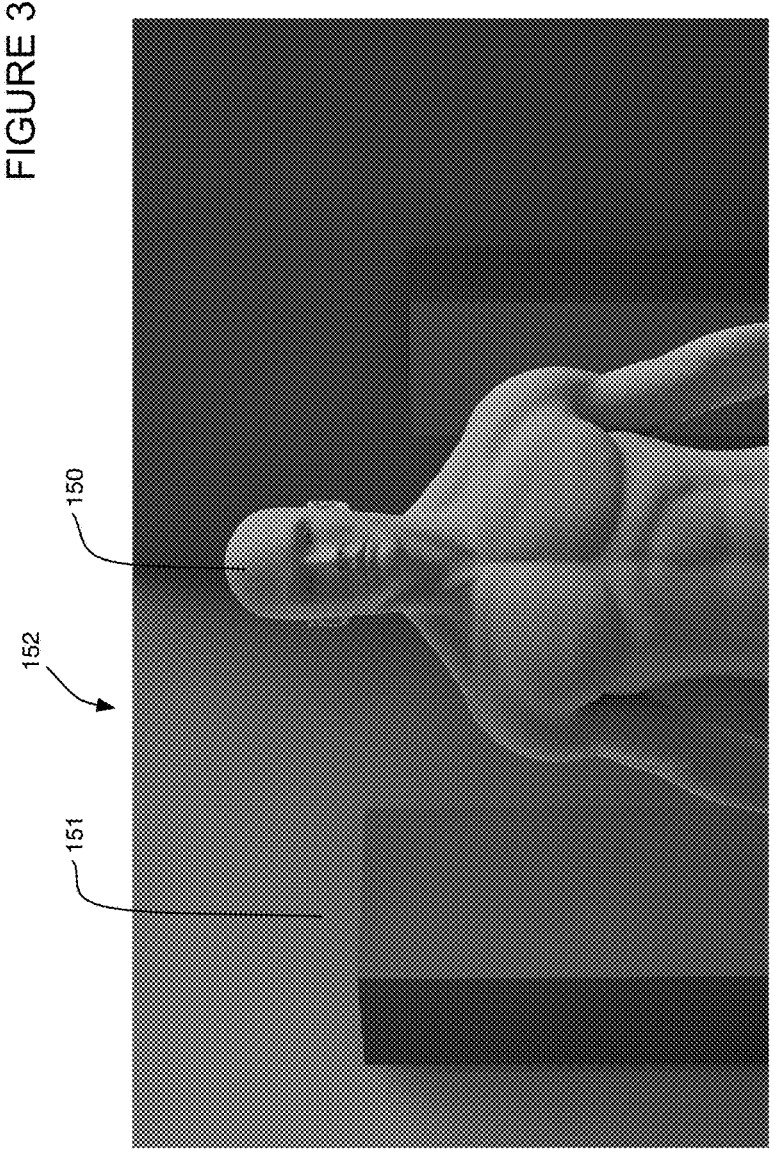
FIG. 3 illustrates an example two-dimensional input image.

FIG. 3 illustrates an example two-dimensional input image. As shown, foreground object 150, here a CGI human torso and background object 151, here a box form a scene in two-dimensional space with no depth information encoded into the image.

Figure 4:
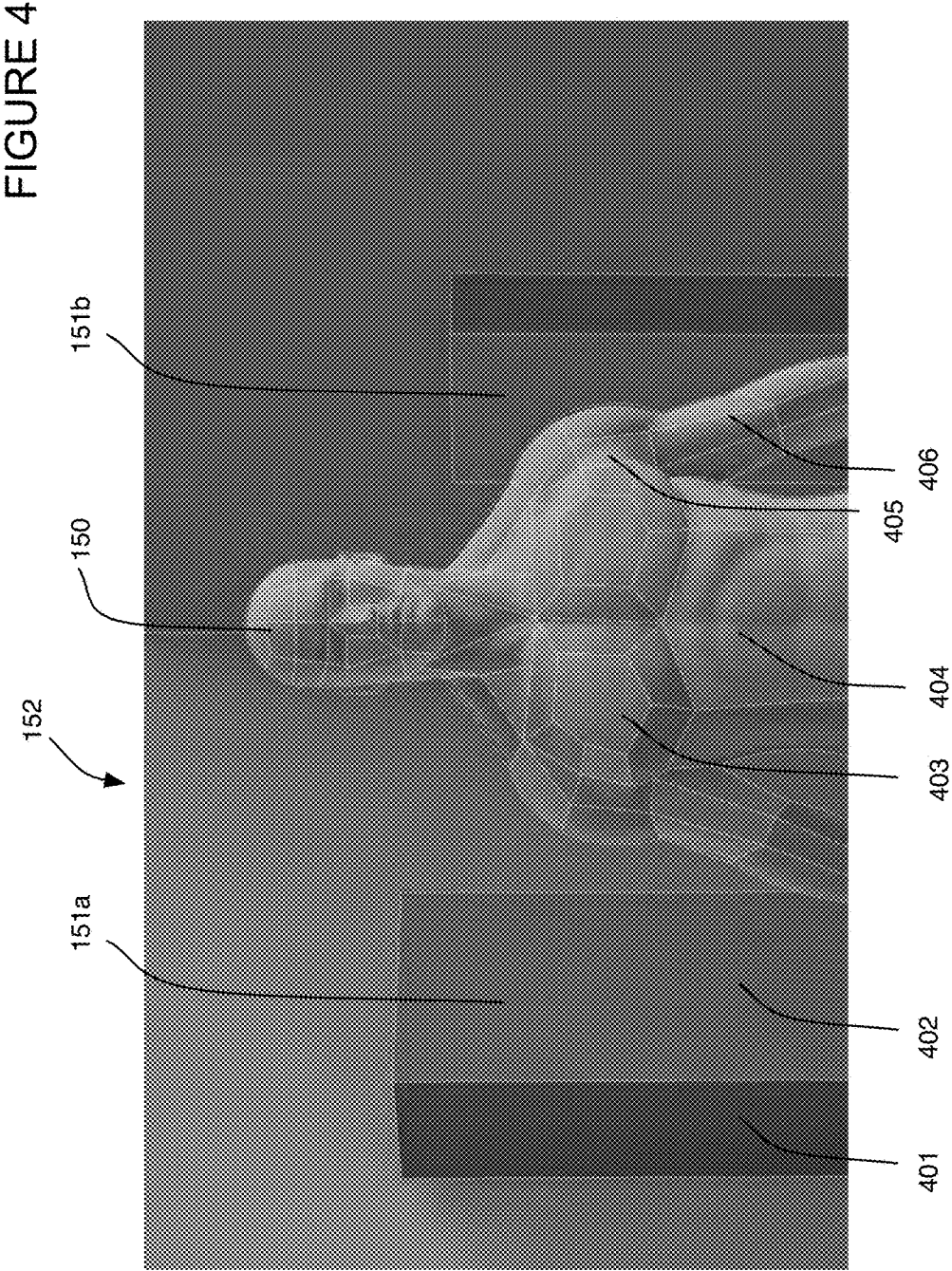
FIG. 4 illustrates an example set of masks applied to areas or regions of the two-dimensional input image.

FIG. 4 illustrates an example set of masks applied to areas or regions of the two-dimensional input image. As shown, masks 401 and 402 are utilized to represent sides of the box 151a with flat planes, while masks 403, 404, 405, 406 are utilized to represent portions of the human torso with flat and/or curved planes, namely the front of the pectoral area, stomach area, front inner shoulder area, and front bicep area of the human torso. The other box in the background, box 151b is also shown with masks that are covered by foreground object, e.g., the human torso. Embodiments of the invention may also include obtaining at least one mask associated with at least one area within the two-dimensional image by automatically generating the at least one mask comprising the at least one area wherein the at least one area is over a predefined size and within a predefined depth range, or automatically generating the at least one mask comprising the at least one area wherein the at least one area comprises a boundary having a difference in luminance values over a predefined threshold, or both methods of size, depth range and boundary or any combination thereof. As shown masks representing flat planes 401 and 402 may be obtained by determining that they are over N pixels by M pixels and have within a K to L range in orthogonal vector value. The test regions for generating masks may be iterated through the image and enlarged to fit the underlying area if the depth data is within the K to L range for example. Masks 403-406 may be curved or faceted or flat to represent the shape of any underlying portion that is within a predefined size and/or vector range for example. Any algorithm for detecting object types and assigning predefined mask groups to represent the underlying two-dimensional image are in keeping with the spirit of the invention.

Figure 5A:
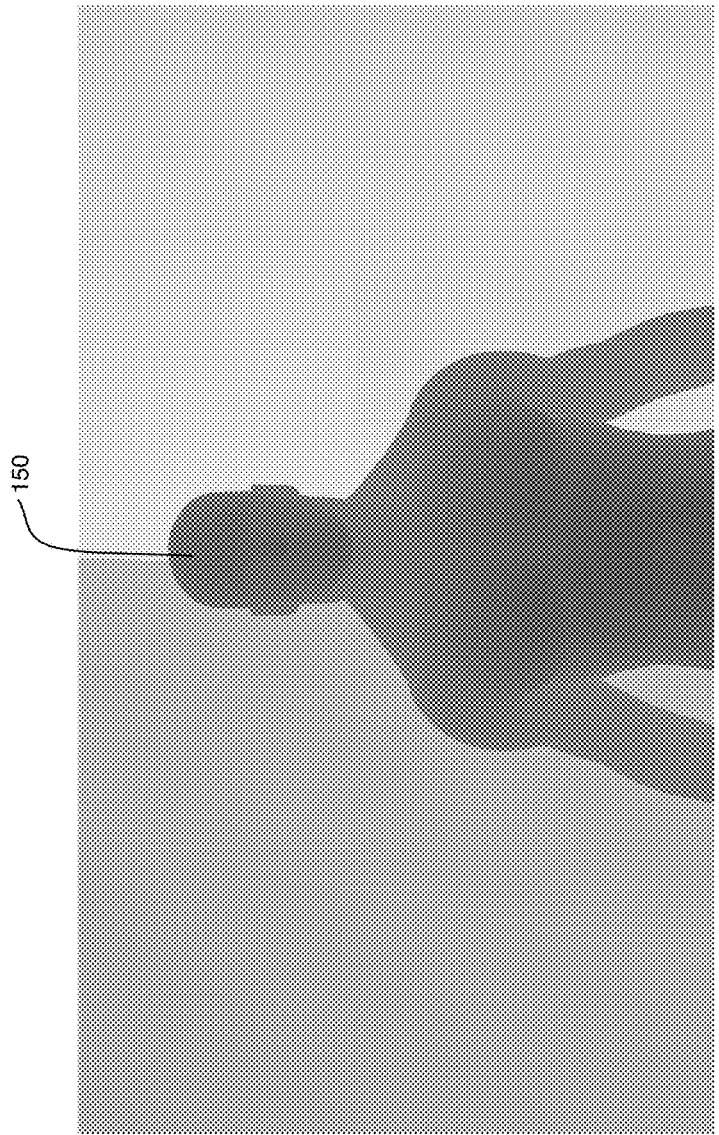
FIG. 5A illustrates a perfect error free input depth map associated with the two-dimensional image.

FIG. 5A illustrates a perfect error free input depth map associated with the two-dimensional image. As shown, darker luminance values are encoded as nearer to the observer, although the reverse encoding may be utilized. There is no requirement that the depth map has to be in a viewable format, however, this encoding may enable intuitive viewing of depth errors for example. If all depth maps were error free, then embodiments of the invention may still be utilized to alter depth associated with the two-dimensional image in a manageable manner. However, since most depth maps are not perfect, embodiments of the invention enable error minimization and manageability unknown in the art.

Figure 5B:
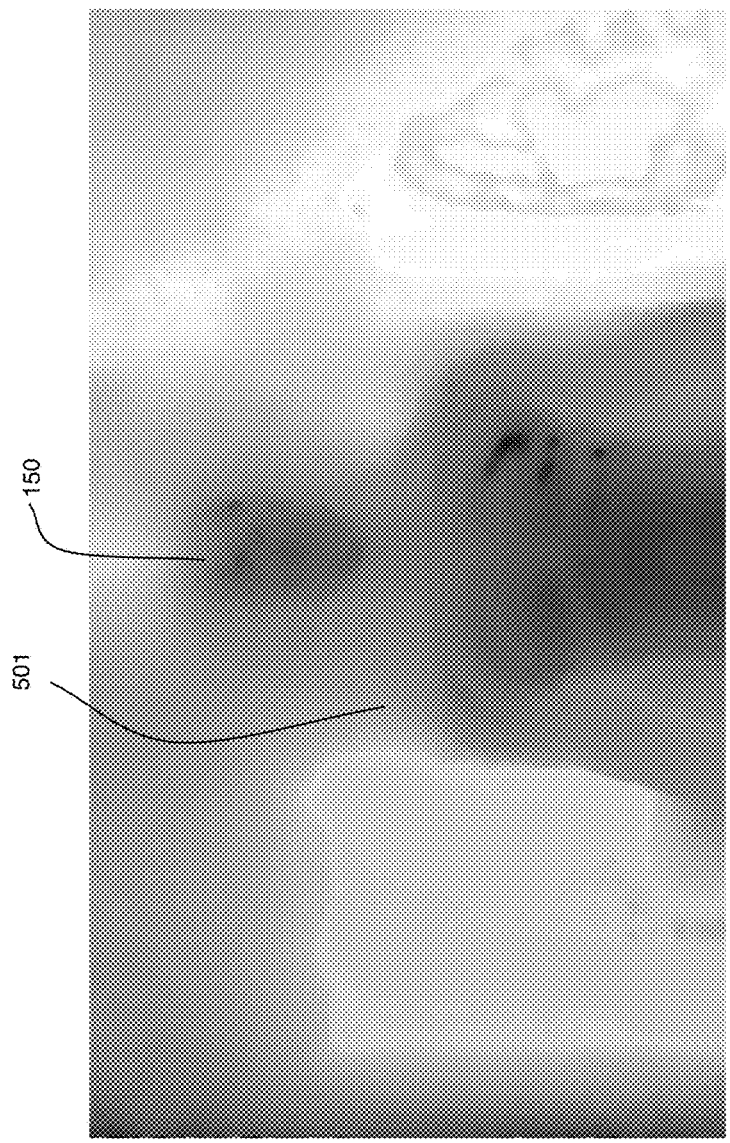
FIG. 5B illustrates a typical depth map having erroneous depth data as acquired from or calculated from an external depth capture apparatus or system.

FIG. 5B illustrates a typical depth map having erroneous depth data 501 as acquired from or calculated from an external depth capture apparatus or system. This problem makes some external depth maps nearly unusable for automated depth conversion, however, embodiments of the system enable use of error prone depth maps in a manageable manner.

Embodiments of the method may also include obtaining of the external depth map associated with a two-dimensional image by obtaining a disparity map, or a depth map of lower resolution than the two-dimensional image from a pair of witness cameras, or a depth map from time-of-flight system, or a depth map from a triangulation system. Embodiments of the invention may also include obtaining any type of depth map at 201 including Z-Depth associated with images that are generated through rendering from a Computer Generated Imagery or CGI application such as MAYA® or HOUDINI® as shown for example in FIG. 5A, depth maps obtained after conversion of a disparity map from a stereoscopic pair of images to a Z-Depth for example as shown in FIG. 5B, Z-Depth extraction from of a light-field image, time-of-flight imaging systems, LIDAR, or any other type of depth map associated with a two-dimensional image.

Embodiments of the invention include a number of inherent advantages over simply using the Z-Depths as is currently performed in automated or semi-automated 2D to 3D conversion processes.

For example, embodiments of the invention transform the large set of depth map depths or Z-Depth into a manageable number of parts. Thus, the system enables artist 160 to manipulate individual or groups of parts for artistic purposes, as opposed to pixel-by-pixel editing. So, for example, the artist may independently adjust the angle, and hence depth of a robot's arm so the resulting stereoscopic image appears to reach out of the screen. In one or more embodiments, the planes may be grouped and movement or reshaping of a plane in two or three dimensions may move or reshape other grouped or otherwise coupled planes.

In addition, by transforming the Z-Depth into a manageable number of parts, the system enables an artist to group these parts and apply separate RGB image layers to these groups. This enables more efficient occlusion filling in the 2D to 3D conversion workflow.

Figure 6A:
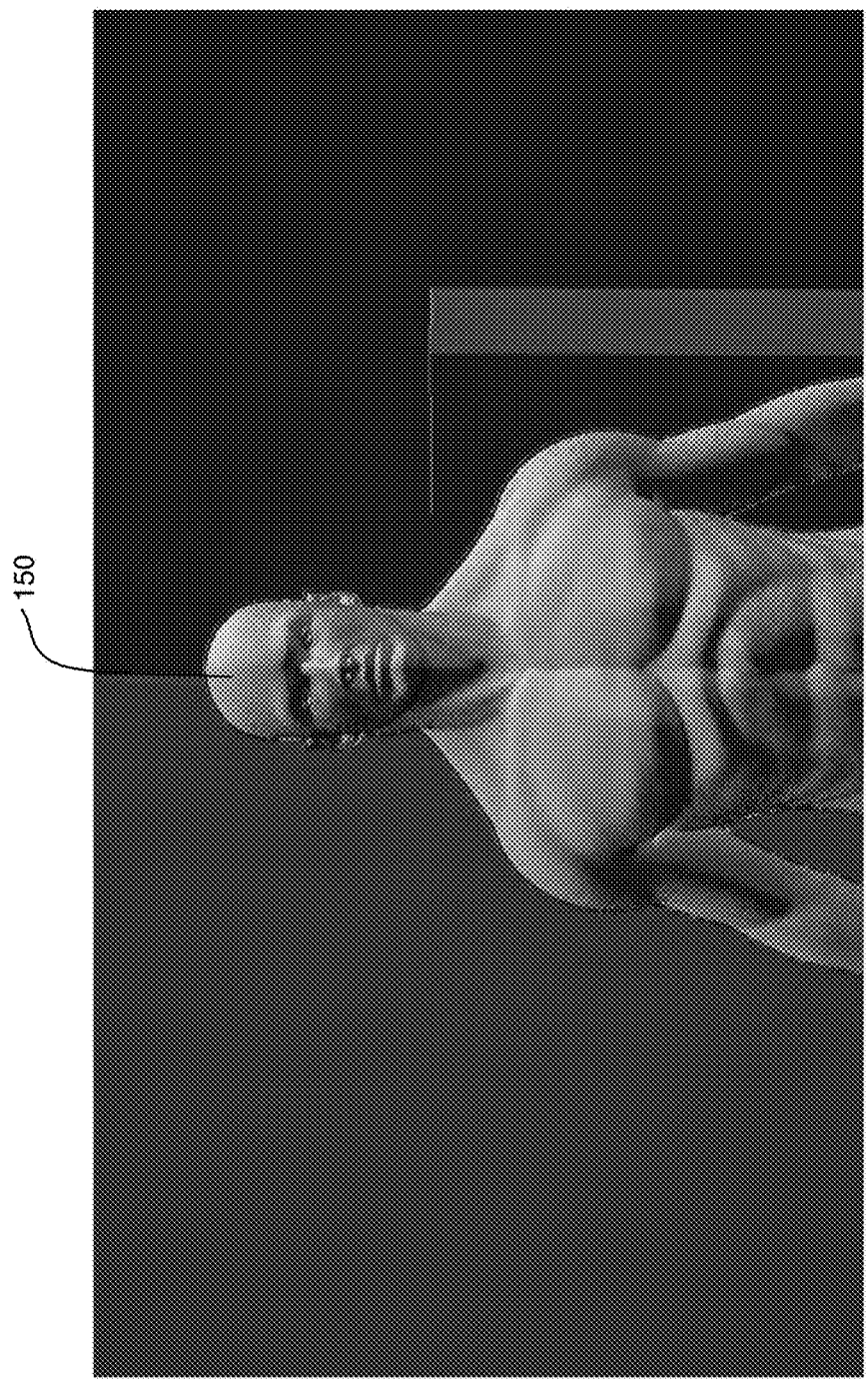
FIG. 6A illustrates a perfect normal map showing colors associated with angles of the surface of pixels within the two-dimensional image of FIG. 5A.

FIG. 6A illustrates a perfect normal map showing colors associated with angles of the surface of pixels within the two-dimensional image of FIG. 5A. For example by encoding separate RGB channels with X, Y and Z information related to the vector orthogonal to the particular area, a viewable format for normal vectors is thus obtained. If X increases from left to right, and Red is utilized as the X vector channel, then areas pointing to the right for example have a higher red value. If Y increases in the vertical direction and if Green is utilized for the Y channel, the areas having an orthogonal vector pointing have a higher green value. Any other encoding for visually viewable normal vector formats is in keeping with the spirit of the invention.

Figure 6B:
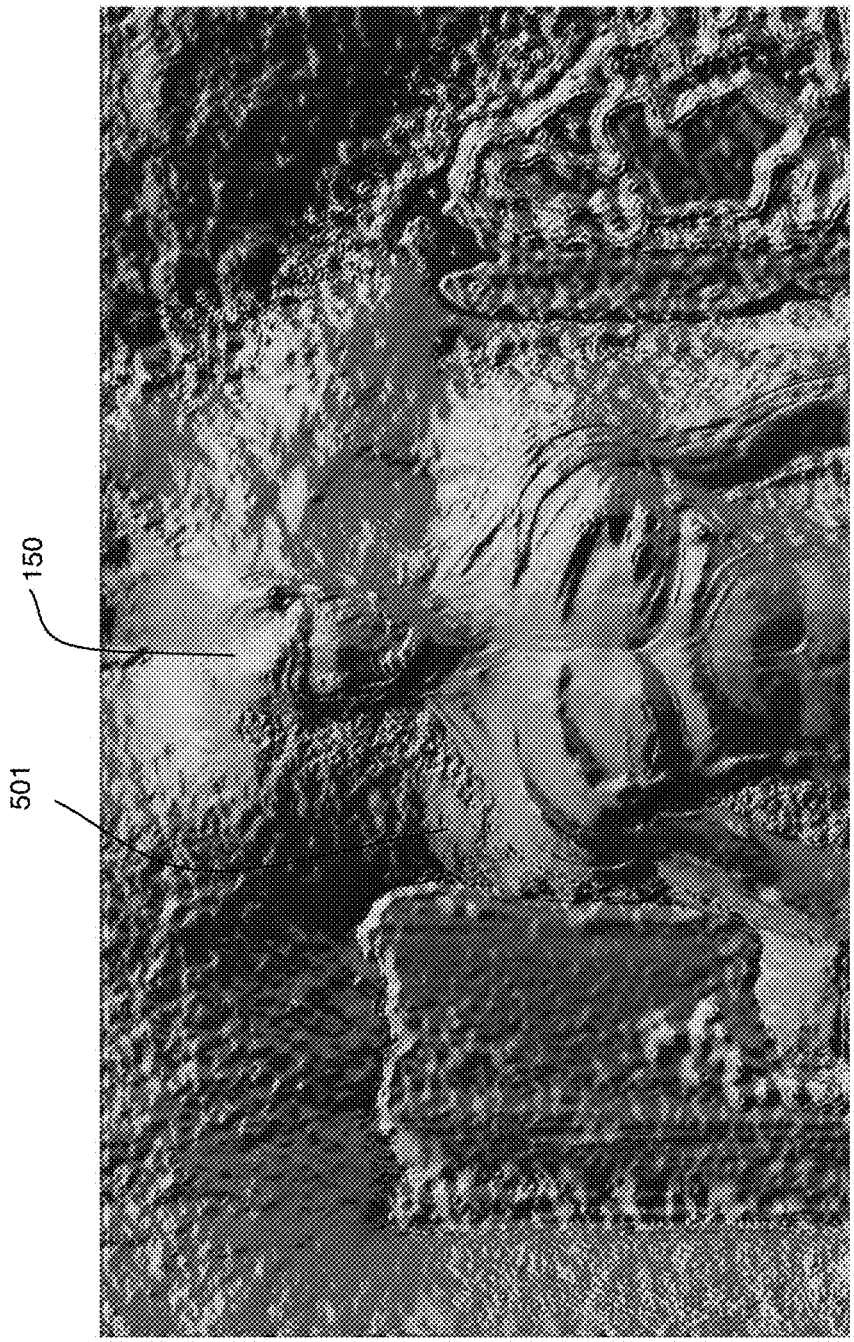
FIG. 6B illustrates an imperfect normal map associated with erroneous depth data as acquired from or calculated from an external depth capture apparatus or system as shown in FIG. 5B.

FIG. 6B illustrates an imperfect normal map associated with erroneous depth data as acquired from or calculated from an external depth capture apparatus or system as shown in FIG. 5B. This image shows the severe problems with error prone depth data showing error area 501 indicating an area that is pointing upward, when it is really not (see FIG. 6A for error free portion of image).

Figure 7A:
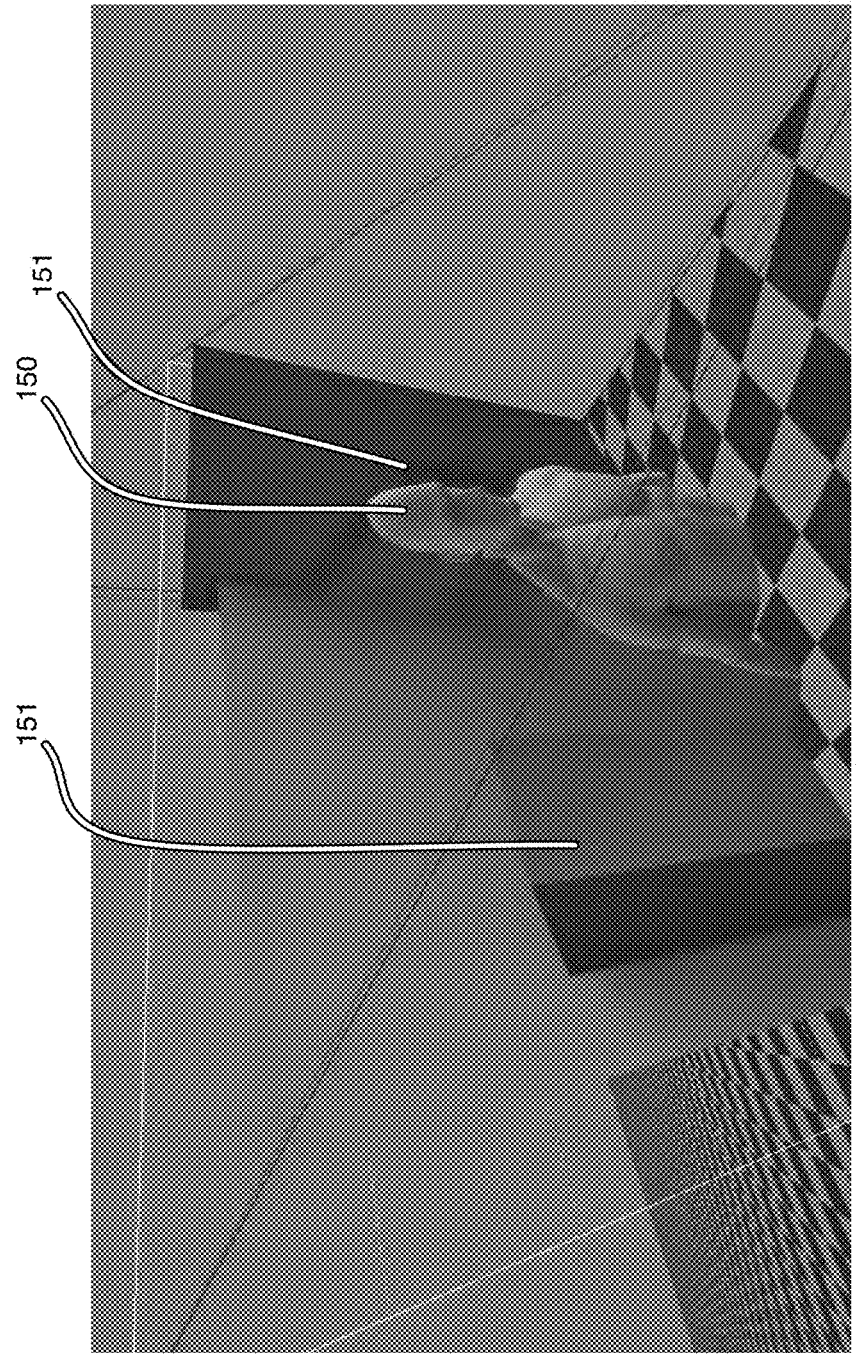
Figure 7B:
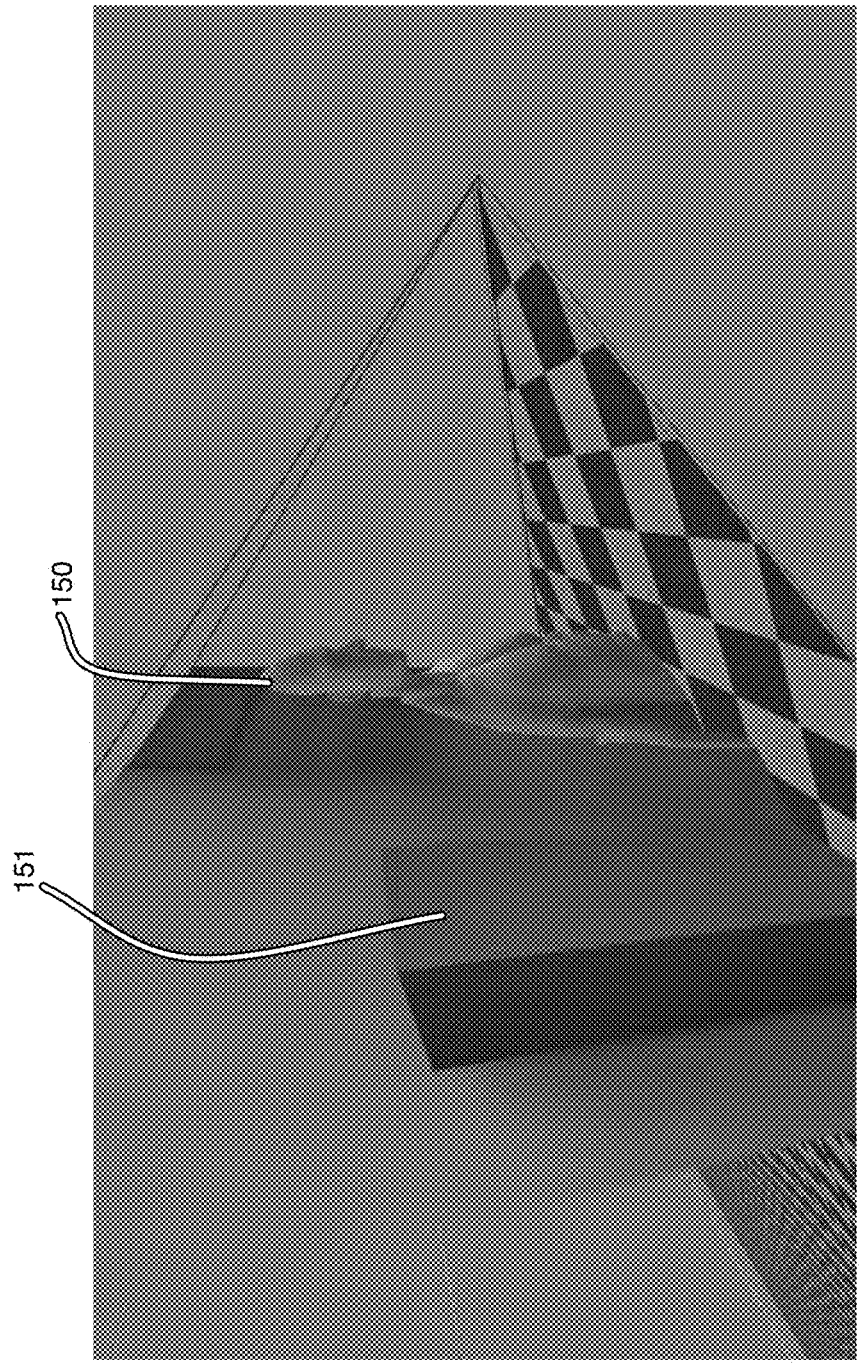

FIGS. 7A-C illustrate a perspective, side and top view of perfect error-free depth applied to the two-dimensional input image. If depth is error free, then the foreground object may be viewed with depth without errors in the foreground object, however, depending on the depth capture system, missing background data may exist and cause artifacts if there are not other images in a scene that have the missing background information. This occurs for example if the foreground object does not move with respect to the background during the scene.

Figure 7F:
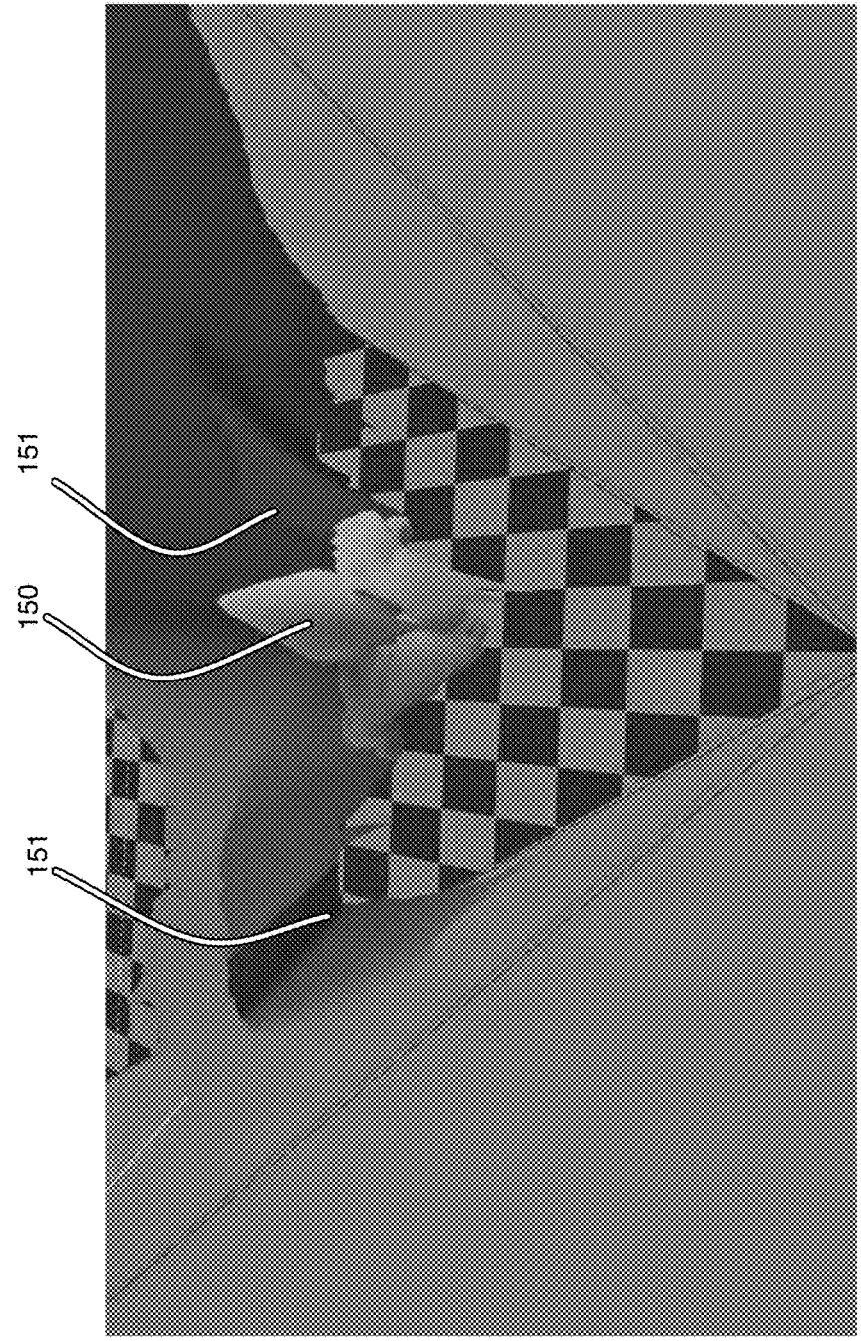

FIGS. 7D-F illustrate a perspective, side and top view of imperfect typical depth having errors and acquired from an external depth capture apparatus or system and applied to the two-dimensional input image. As shown, portions of the torso stretch outward when they should not, errors in the left box 151 are shown as well with a curved flat surface near the top. The errors in the depth shown as applied in FIGS. 7D-F are difficult to fix by an artist since the errors occur on a small granular level, for example pixel or sub-pixel and require tedious paint style operations to correct. In addition, altering a depth of a visible area such as the arm is also quite difficult and economically unfeasible since the operations occur at the pixel level and not associated with a mask or masks that represents the arm for example.

Figure 8B:
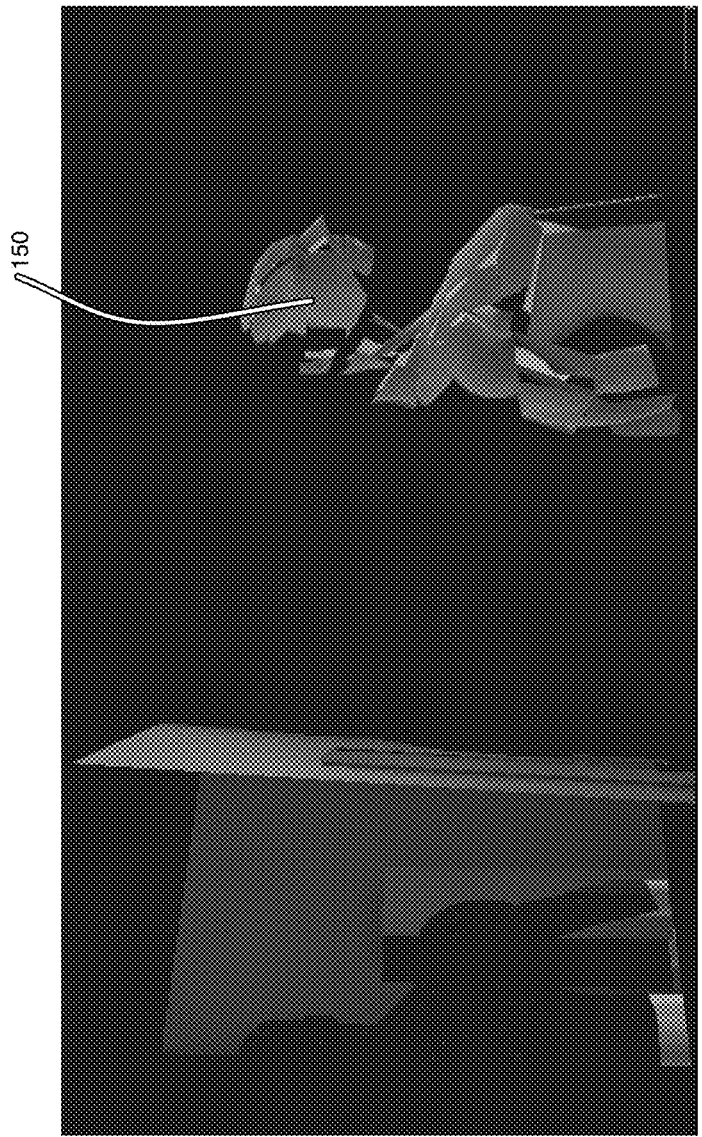

FIGS. 8A-C illustrate a perspective, side and top view of perfect error-free depth applied to planes and/or masks of areas or regions associated with the two-dimensional input image. If error free depth maps are obtained by the system, then applying the masks of FIG. 4 results after calculation of plane rotations for example results in a readily editable image.

Figure 8E:
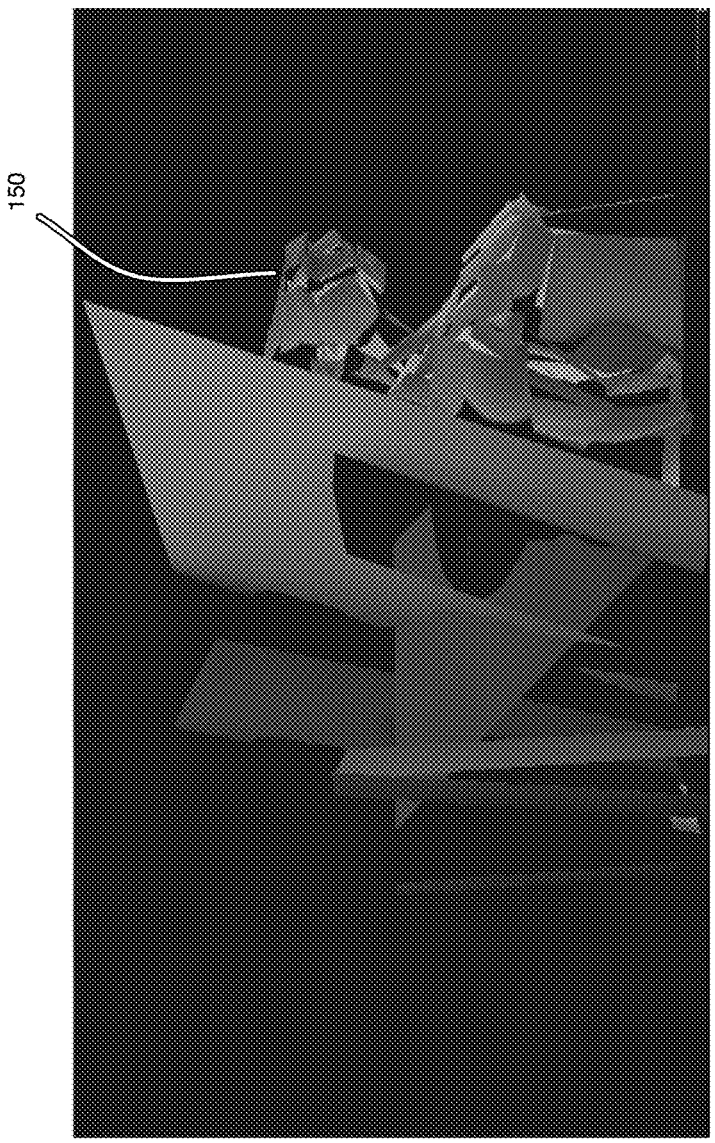

FIGS. 8D-F illustrate a perspective, side and top view of imperfect typical depth acquired from an external depth capture apparatus or system and applied to planes and/or masks of areas or regions associated with to the two-dimensional input image. As shown, many of the errors of shown in FIGS. 7D-F are entirely or nearly entirely eliminated which enables rapid adjustment of depth of correction of depth errors if at all depending on the quality requirements of the particular project. For example, through calculation of best fit planes (whether flat or curved) at 203 as detailed above with respect to FIG. 2, many of the errors are minimized or otherwise averaged away.

Whether using a perfect depth map that is error free or not, embodiments of the invention may also include calculating the best fit for a plane using a computer based on depth associated with the at least one area associated with each of the at least one mask by calculating a normal vector for the plane, or a regression fit for the plane, or an orthogonal distance regression fit for the plane, or in any other known manner regarding fitting a plane to particulars points in three-dimensional space. Specifically, embodiments of the invention mold depth data to eliminate depth errors by transforming large numbers of depth values to smaller number of plane rotations. In one embodiment, the system may calculate the normal and position for a specific region, for example to form an average, rotation value associated with a plane that represents a large group of depth values, some of which may be erroneous. Hence, issues associated with imperfect depth map data are often averaged out, or otherwise eliminated. In some extreme cases of noisy depth data, these issues may not be fully resolved, however, embodiments of the invention reduce the problem to a manageable number of editable parts, and enable the issues to be rapidly and easily corrected automatically or by accepting inputs from an artist. Although embodiments of the invention may utilize a normal vector approach, other algorithms may be utilized alone or in combination to achieve similar or advantageous results. For example, embodiments of the invention may treat each pixel as a point in space, e.g., wherein X and Y represent the position of the pixel and Z represents the Z-Depth value of that pixel, and isolate only the points within the defined region, and calculate the "best-fit" plane for that group of points. Embodiments of the invention may utilize any type of plane fitting algorithm including but not limited to regression plane, orthogonal distance regression plane, etc. Commonly available statistics toolboxes include orthogonal regression using principal components analysis for example that may be utilized as off the shelf software components for calculation of best fitting planes to a number of points for example to minimize the perpendicular distances from each of the points to a plane. Embodiments of the invention may utilize any type of filtering as part of the transformation processing including but not limited to dilation and erosion. In one or more embodiments, an algorithm that iterates over a set of depth slopes and averages the slopes over an area for example is one example of an algorithm that may be utilized to calculate the normal vector for a particular area of the depth map.

Figure 9B:
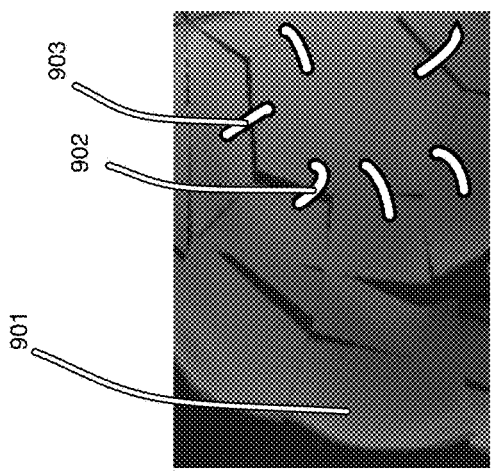
FIG. 9B illustrates a close-up view of a portion of FIG. 9B showing plane grouping with or without minimum and maximum connections and with or without spring attachments having a spring constant for example.
Figure 9A:
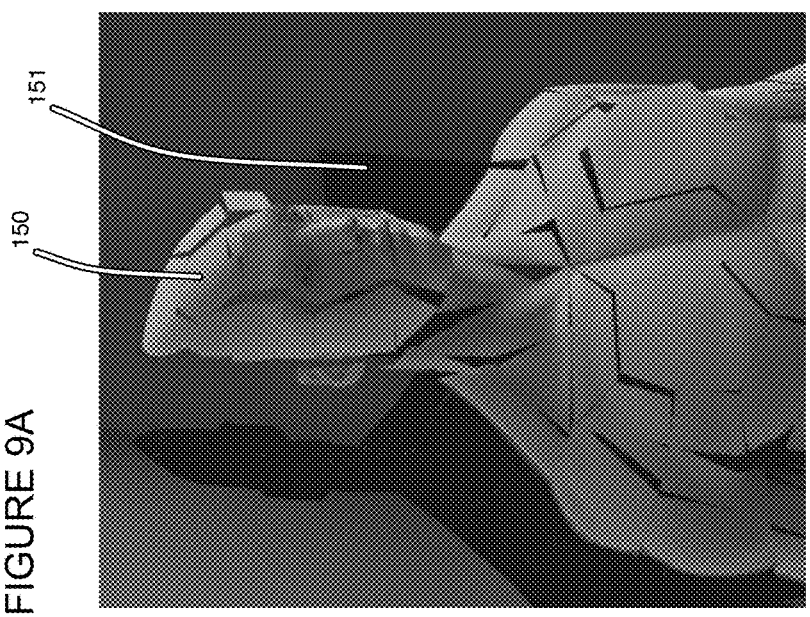
FIG. 9A illustrates a close-up view of the imperfect typical transformed into rotated planes which may or may not be flat planes, or curved planes or surfaces and which yield a manageable set of information that enables correction of the errors automatically by the system or through manual artist input accepted and processed by the system.

FIG. 9A illustrates a close-up view of the imperfect typical transformed into rotated planes which may or may not be flat planes, or curved planes or surfaces and which yield a manageable set of information that enables correction of the errors automatically by the system or through manual artist input accepted and processed by the system. As shown, even with a high degree of erroneous depth data, the masks are low in number, and thus are far easier to adjust to correct depth associated with the two-dimensional image.

FIG. 9B illustrates a close-up view of a portion of FIG. 9B showing plane grouping with or without minimum and maximum connections and with or without spring attachments having a spring constant for example. In one or more embodiments, plane grouping may be visibly shown and editable to enable grouped planes to be repositioned by accepting a drag or other user input wherein the couplings 902 and 903 thus pull or otherwise drag or reposition attached planes. Any algorithm such as an iterative algorithm for moving attached planes with minimum and maximum coupling distances or spring constants is in keeping with the spirit of the invention. One such method iterates over each coupling after accepting a user move and moves each attached plane. If a coupling is maximized then the grouped planes move as well. If the couplings have a spring constant F=k*x, then a force may be imparted on the other planes, which may have masses associated with them for example based on size to visually show non-rigid coupling moves of multiple grouped planes.

Alternatively or in combination, embodiments of the invention may include altering automatically any combination of position, orientation, shape, depth or curve of said plane in order to fit edges or corners of the plane with another plane. This enables a plane to be positioned in three-dimensional space, rotated in three-dimensions, reshaped by moving a corner point, warped in effect by adding depth or a curve to the plane, for example to add depth to the plane itself to match the underlying image data. Embodiments of the invention may also include accepting an input to alter any combination of position, orientation, shape, depth or curve of the plane, for example to artistically fit the underlying image data, correct errors or artifacts from the automated fitting process for touch up, etc.

Embodiments of the invention generally also include applying depth associated with the plane having the best fit to the at least one area to shift pixels in the two-dimensional image horizontally to produce a stereoscopic image or stereoscopic image pair. Any type of output that is capable of providing different left and right eye information is in keeping with the spirit of the invention.

One or more embodiments of the invention may use external depth information incorporated into a 3D model of one more objects that appear in a scene. A 3D object model may for example provide depth for the portions of an object, rather than for an entire image or an entire sequence of frames in a video. By locating and orienting the 3D object model in each image or frame, one or more embodiments may simplify the task of generating a depth map for an entire image or for an entire video.

Figure 10:
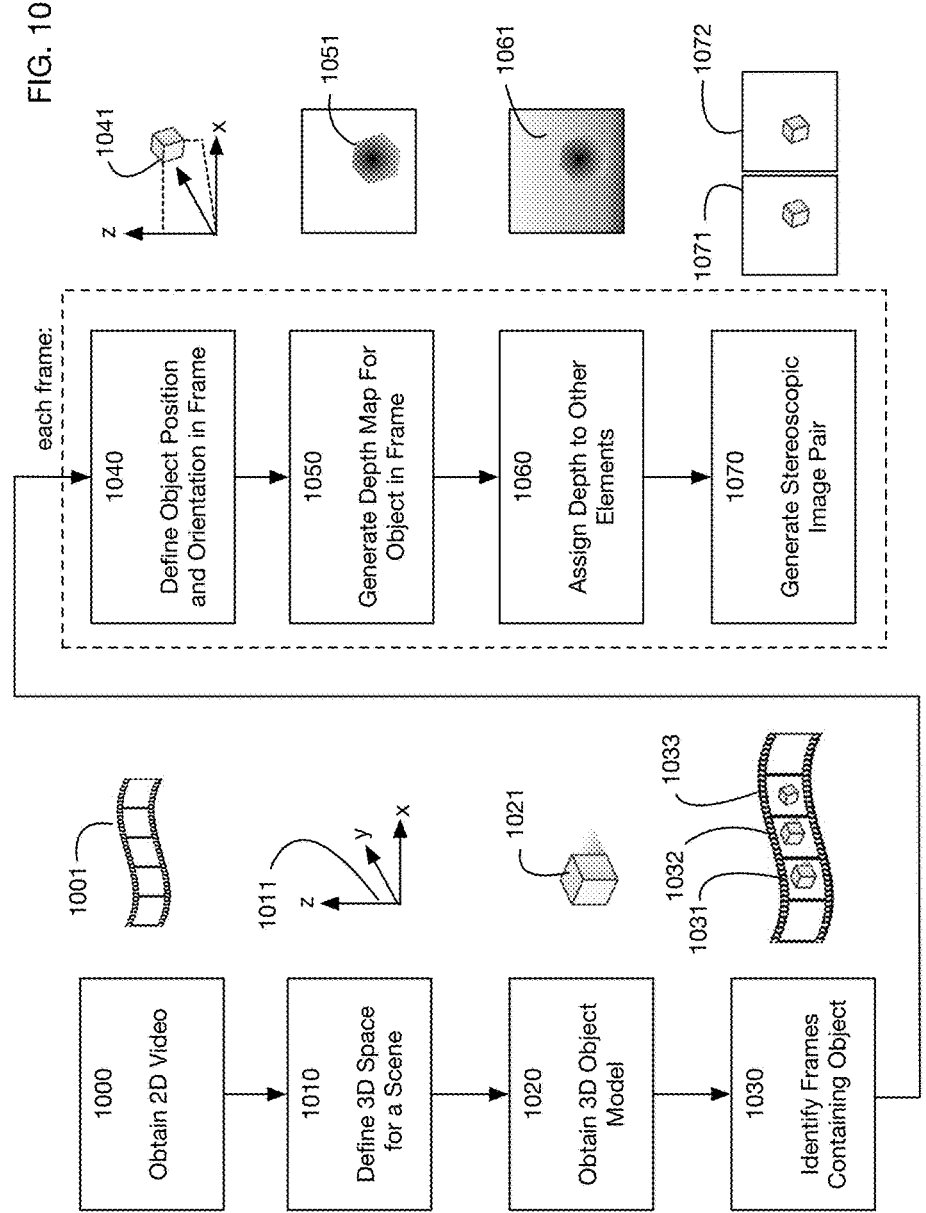
FIG. 10 illustrates a flowchart of an embodiment of a method to convert 2D video to 3D video using an object model that defines the three-dimensional shape of an object that appears in one or more scenes of the 2D video.

FIG. 10 illustrates a flowchart of an embodiment of a method that uses a 3D object model to convert a 2D video to a 3D video. A 2D video 1001 is obtained in step 1000. The video 1001 may contain one or more scenes, where a scene is for example associated with a particular location for a shot. In step 1010 a 3D space 1011 is defined for one of the scenes of the video 1001. This 3D space may for example define a coordinate system for the location of the scene. To convert a 2D video 1001 to 3D, objects in the scene must be located in this 3D space 1011. Techniques known in the art for 2D to 3D conversion often require manual depth assignment to every pixel or to every region of each frame. This process is time-consuming and labor-intensive. In some situations, significant efficiencies may result from modeling the 3D shape of one or more objects once, and applying these 3D object models across frames. In the embodiment of FIG. 10, a 3D object model 1021 is obtained. One or more embodiments may obtain any number of 3D object models.

3D object models may be obtained from any source and in any format. For example, without limitation, 3D object models may comprise point clouds, polygonal models, depth maps, disparity maps, parallax maps, parameterized surfaces such as NURBS surfaces, or 3D models in any of the file formats used in the art such as for example 3DS, FBX, OBJ, STEP, STL, DAE, X3D, BLEND, or others. In one or more embodiments 3D object models may be combinations of any of the previous examples or of any other 3D model formats.

In step 1030 the frames containing the object are identified. For example, in FIG. 10, frames 1031, 1032 and 1033 of video 1001 contain images of the object with 3D object model 1021. In one or more embodiments frames containing the object or objects of interest may be determined manually. In one or more embodiments frames containing the object or objects of interest may be determined automatically using a computer. For each of these frames the embodiment shown in FIG. 10 uses the 3D object model 1021 to convert the frame to 3D. In step 1040, the object position and orientation in the frame is determined. This results in placing the object model 1021 in 3D space 1011, resulting in transformed object model 1041. From this transformed 3D object model 1041, step 1050 generates a depth map 1051 for the object in the frame. Depth map generation from the transformed 3D object model is a straightforward calculation since the location of each point of the object is known in the 3D space 1011. In step 1060, depth 1061 is assigned to additional elements, if any, in the frame. In one or more embodiments multiple objects of interest may exist in a frame, and multiple 3D object models may be applied to the frame to generate individual object depth maps; these individual object depth maps may then be combined into an overall depth map. In one or more embodiments additional 3D modeling or depth editing steps may be used to complete the depth map for a frame. In one or more embodiments the 3D object model may comprise the entire frame, so that additional depth map generation is not required. In step 1070, a stereoscopic image pair is generated from the frame; this image pair comprises left image 1071 and right image 1072. Using techniques known in the art, pixels may be shifted horizontally between the left and right images based on the depth map 1061. One or more embodiments may use any technique known in the art to generate stereoscopic image pairs from depth maps or from other 3D model information. For example, one or more embodiments may use any of the techniques known in the art for filling of gaps created by pixel shifting.

Figure 11:
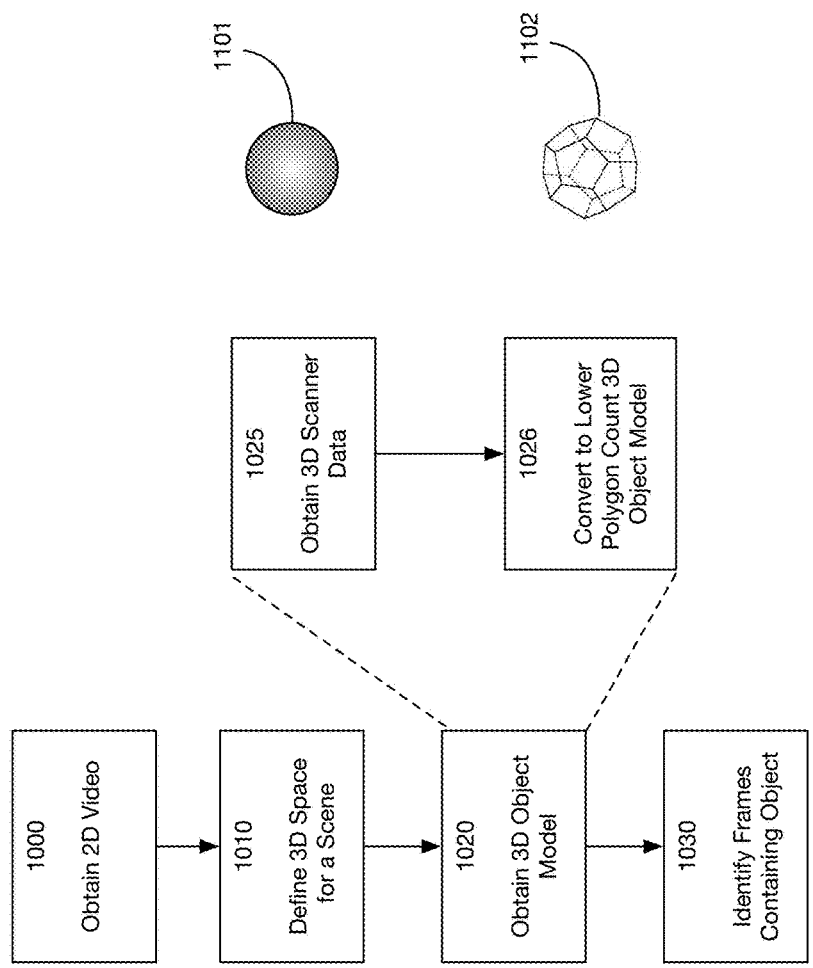
FIG. 11 illustrates an embodiment of the method shown in FIG. 10, where the 3D object model is obtained from 3D scanner data captured from the object.

One or more embodiments may obtain one or more 3D object models from any source or sources and in any format or formats. One potential source for 3D object models is 3D scanner data. 3D scanner data may for example be obtained from an object and converted into a 3D object model used for 2D to 3D conversion. Any object may be used to generate a 3D object model, such as for example, without limitation, a person, a group of persons, an animal, an inanimate object, a machine, a building, a vehicle, a computer-generated figure, or a physical model of any other object. FIG. 11 illustrates an embodiment of this method. Step 1020, obtain 3D object model, comprises two steps: step 1025 obtains 3D scanner data 1101 of an object, and step 1026 converts this 3D scanner data to a lower polygon count 3D object model 1102. 3D scanner data may be obtained using any 3D scanning technology. Technologies known in the art include for example contact and non-contact methods. Non-contact methods include for example laser time-of-flight methods, laser triangulation methods, holographic methods, and structured light methods. Any or all of these methods, or any other 3D scanning methods, may be used as part of the process of obtaining a 3D model of an object. Embodiments may obtain 3D scanner data in any format, including for example, without limitation, point clouds, polygonal models, NURBS surface models, or 3D models in any of the formats known in the art. One or more embodiments may use 3D scanner data directly as a 3D object model. One or more embodiments may convert 3D scanner data to a different format. For example, a point cloud may be converted to a polygon model or a parameterized surface model using techniques known in the art. One or more embodiments may convert 3D scanner data to a lower polygon count 3D model for efficiency of processing, as illustrated in step 1026. Reducing the polygon count of a 3D model is known in the art as retopologizing; one or more embodiments may use any retopologizing methods or technologies known in the art to convert 3D scanner data or other 3D models to a lower polygon count 3D model. One or more embodiments may use 3D models that comprise parameterized surfaces, such as NURBS surfaces for example, instead of or in addition to polygons.

Figure 12:
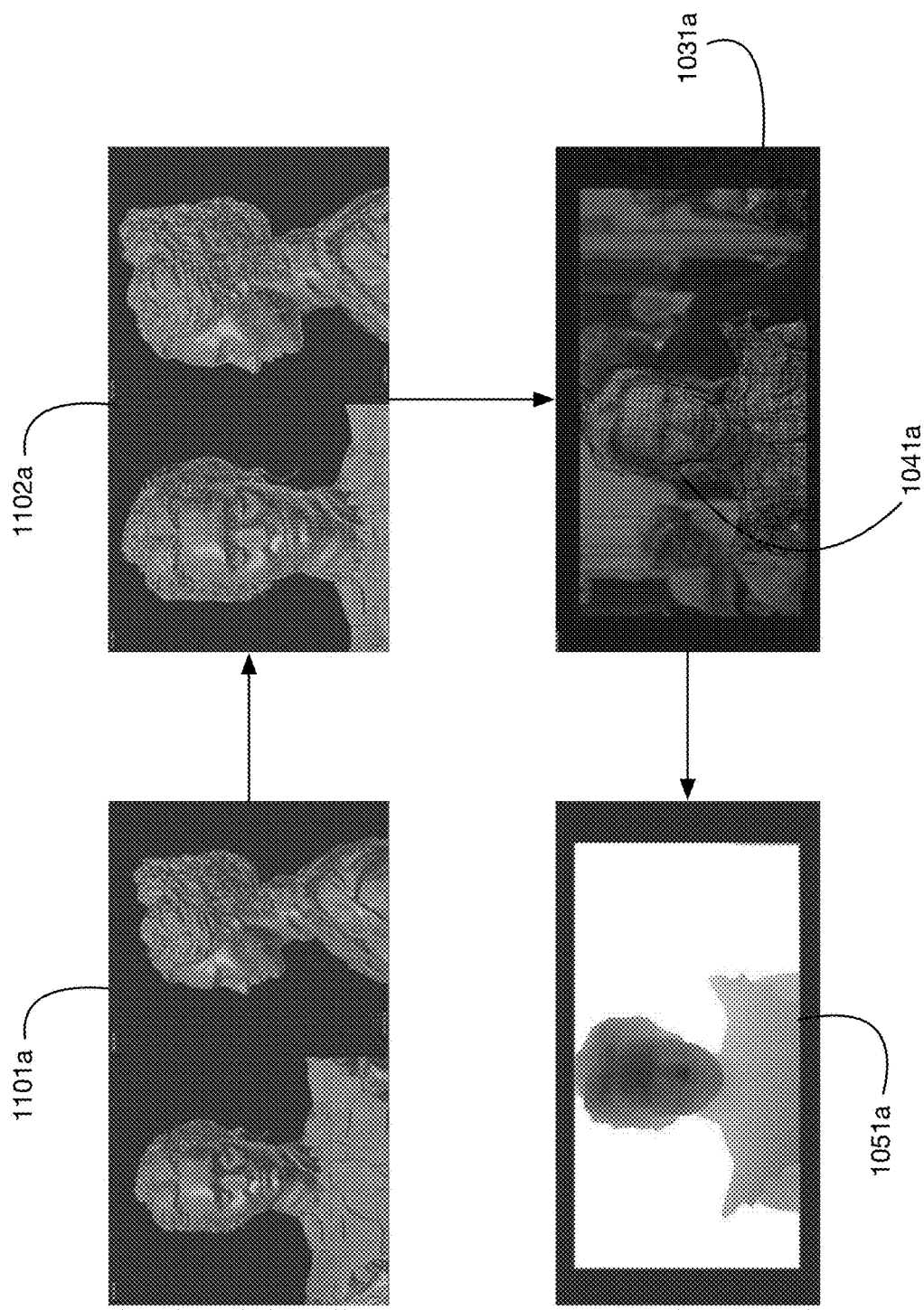
FIG. 12 illustrates an example of steps from FIG. 11 applied to a particular object in a video frame; 3D scanner data is converted to a polygon model, which is located in a frame, and the model is converted to a depth map.

FIG. 12 illustrates an example of selected steps of the embodiments shown in FIGS. 10 and 11. A 3D scanner model 1101*a* is obtained of an object, as in step 1025 of FIG. 11. This 3D scanner model may for example comprise a very large number of polygons, which may for example have been generated from a point cloud from a 3D scanner. This 3D scanner model is converted to a lower polygon 3D model 1102*a*, shown as an overlay on the 3D scanner model, as in step 1026 of FIG. 11. The model 1102*a* is located and oriented at position and orientation 1041*a* in frame 1031*a*; this step overlays and aligns the 3D object model onto the image of the character in the frame. From this model 1041*a* situated and oriented in the 3D space associated with the scene, depth map 1051*a* is generated for the character. Here depth has not yet been assigned to other elements of the scene in the frame, as indicated by the white background surrounding the character. This process of aligning the 3D model 1102*a* with the image of the character in the frame may be repeated for every frame in the scene containing the character. This use of the 3D model therefore greatly facilitates depth map generation for the scene.

Figure 13:
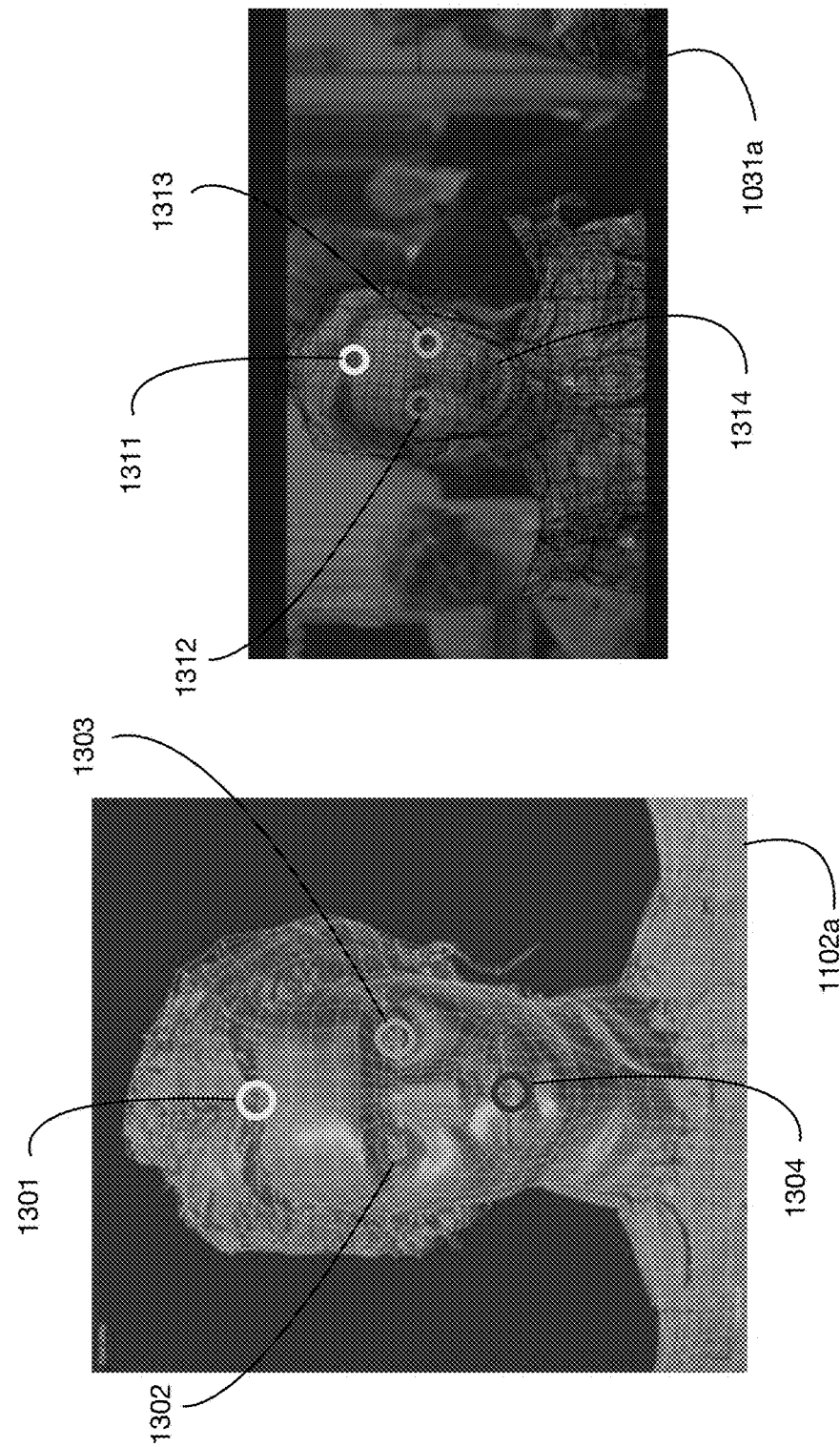
FIG. 13 illustrates an embodiment of a method for determining the position and orientation of a 3D object model in a frame by aligning features of the 3D model with corresponding pixels in the frame.

One or more embodiments may use any technique or techniques to determine the position and orientation of a 3D object model in a frame. These techniques may be manual, automated, or a combination of manual and automated techniques. FIG. 13 illustrates an embodiment of a method that aligns a 3D object model with an image using one or more features. Features may be for example points or regions within an object model that have distinguishing shapes, corners, lines, textures, colors, or other characteristics. In the example shown in FIG. 13, four features 1301, 1302, 1303, and 1304 are selected in the 3D object model. These features are located in frame 1031*a* at pixel coordinates 1311, 1312, 1313, and 1314, respectively. The correspondence between feature positions in the 3D object model and the corresponding pixel coordinates in the frame allows the position and orientation of the object model in the 3D space to be calculated. Techniques for recovering an object pose from the pixel coordinates of its features are known in the art. In general, a unique object pose may be determined from the pixel coordinates of 4 features. For arbitrary numbers of feature points these techniques are known in the art as solutions to the "Perspective-n-Point problem," since they recover the object pose from the projection of n points (features) of the object onto an image plane. For more than 4 features, object pose may be overdetermined, in which case many techniques perform an error minimization to best align an object pose with the projection of the features onto an image. See for example: D. DeMenthon and L. Davis (1995). Model Based Object Pose in 25 Lines of Code. International Journal of Computer Vision, 15(1-2), 123-141. One or more embodiments may use any of the techniques known in the art to obtain or calculate the position and orientation of a 3D object model from the pixel location of any number of model features in an image projection in a frame.

Figure 14:
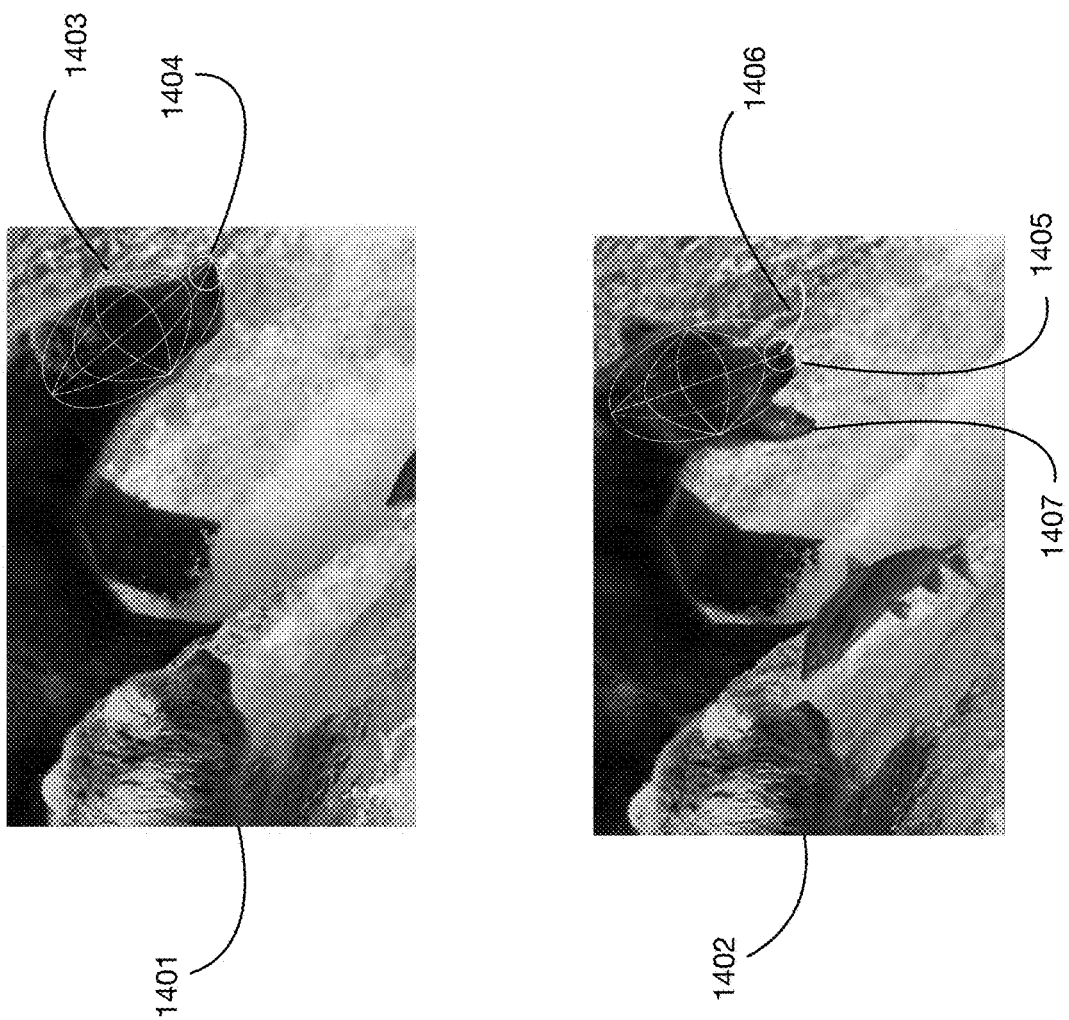
FIG. 14 illustrates an embodiment of a method for tracking features across frames to propagate 3D model position and orientation from a key frame to other frames.

One or more embodiments may locate 3D object model features in one or more frames manually, automatically, or using a combination of manual and automated methods. FIG. 14 illustrates an embodiment that tracks a feature across frames using manual alignment in a key frame with automated tracking of a feature in non-key frames. In this example a 3D object model 1403 of the head of a grizzly bear is obtained, and a feature is selected that corresponds to the tip of the bear's nose. In key frame 1401 the feature is manually located at pixel location 1404 for example by an operator. In non-key frame 1402 the pixel location 1405 of the feature is located automatically by searching pixels for characteristics corresponding to the feature. Techniques for automatic feature tracking are known in the art; one or more embodiments may use any known techniques for tracking features of a 3D object model across frames. Feature track 1406 indicates how the feature pixel location moves across frames. The orientation and position of the 3D object model 1403 in each frame may be determined by tracking multiple features, as described above.

FIG. 14 illustrates a potential issue with a rigid 3D object model. While the object model 1403 matches the object (the bear's head) fairly well in the key frame 1401, in frame 1402 the bear's open jaw 1407 causes the model to deviate from the image. One or more embodiments may use 3D object models with degrees of freedom, for example for moveable joints, to match object images for non-rigid objects. FIG. 15 illustrates a simplified object model for the bear 1500 that incorporates a degree of freedom for the jaw. (Here the model is shown in 2 dimensions for ease of illustration.) The object model is divided into two object model parts 1501 and 1502; each part is rigid, but the parts may move relative to one another. In this illustrative example there is a single rotational degree of freedom 1503 between the two parts, which represents the angle of the jaw. In one or more embodiments, a 3D object model may be modified to incorporate multiple parts and degrees of freedom for relative motion of the parts. This process is known in the art as rigging the 3D object model. One or more embodiments may incorporate one or more rigging steps into the method to account for potential degrees of freedom in the object.

Figure 16:
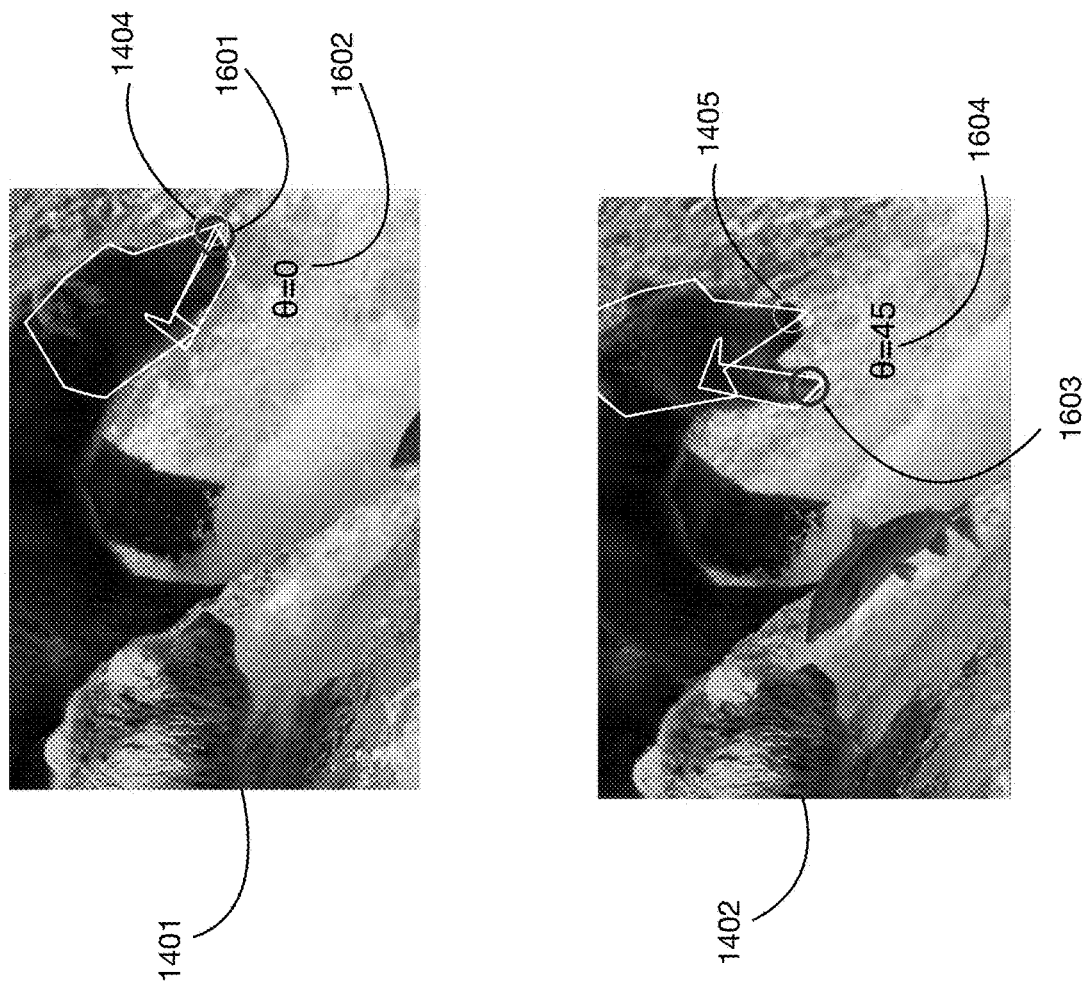
FIG. 16 illustrates tracking the 3D object model of FIG. 15 across frames.

With a rigged 3D object model, aligning the object model with an image in a frame involves positioning and orienting each part of the model. In general, this alignment determines an overall position and orientation for the model, along with values for each degree of freedom. One or more embodiments may use manual, automated, or mixed methods to determine the model orientation and position and the values of each degrees of freedom in any frame. One or more embodiments may manually set the values for each degree of freedom in one or more key frames, and use automated or semi-automated methods to determine these values in non-key frames. For example, one or more embodiments may automatically interpolate values for degrees of freedom between key frames. One or more embodiments may use features on each or a subset of the model parts, and use automated feature tracking for the parts to determine values for the degrees of freedom. FIG. 16 illustrates this process for the example frames shown in FIG. 14, using the rigged 3D object model from FIG. 15. In key frame 1401 an operator aligns the 3D object model with the image and sets the rotational degree of freedom 1602 to zero, representing the closed jaw of the bear. A feature is selected for each part of the model; feature 1404 is the tip of the nose, as before, and feature 1601 is the front tip of the lower jaw for the bottom part of the model. In the key frame these features are adjacent. Automated feature tracking then tracks these features to the non-key frame 1402; feature 1404 moves to location 1405, and feature 1601 moves to location 1603. From these new feature positions, the rotation degree of freedom 1604 may be automatically calculated.

Figure 17:
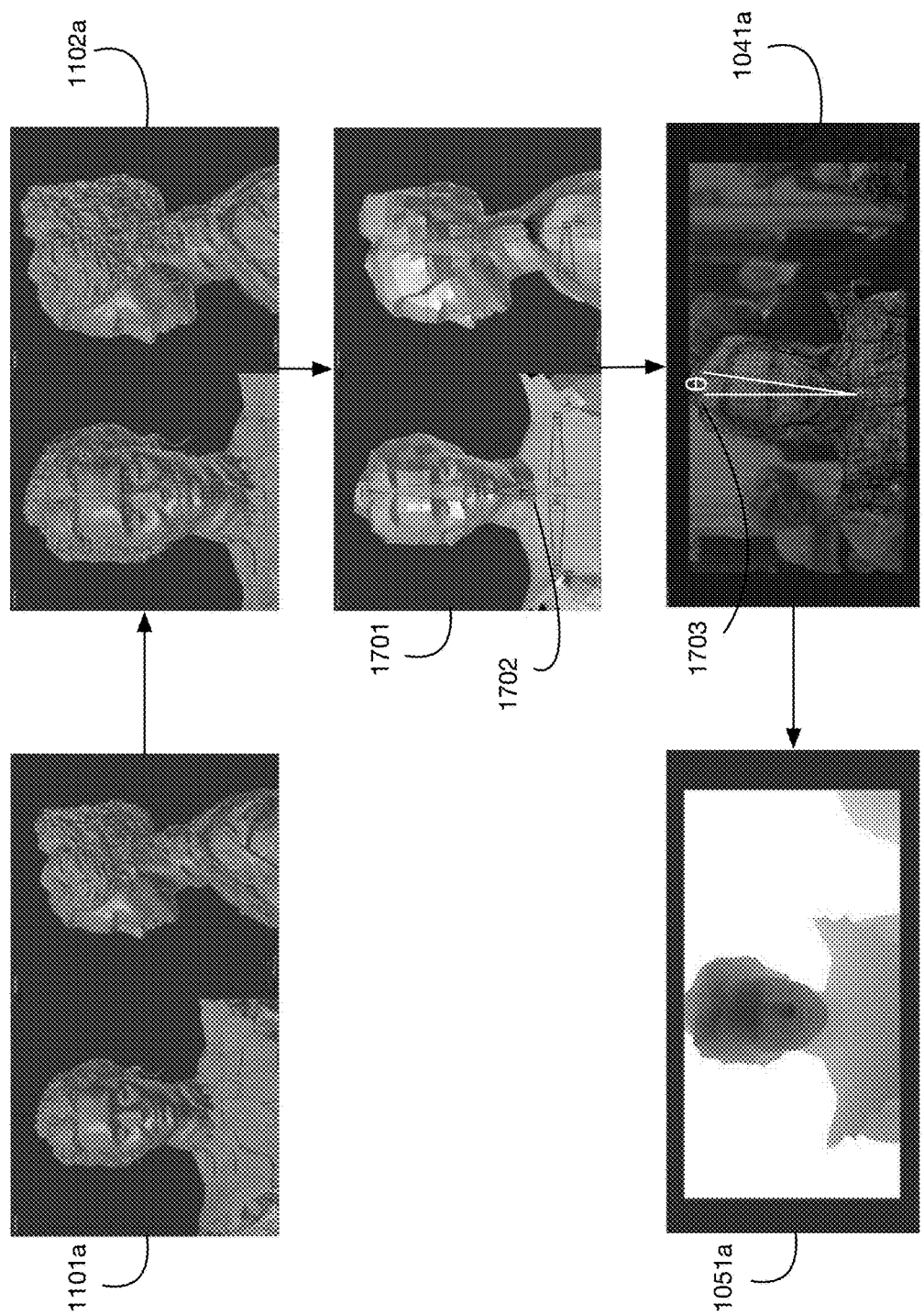
FIG. 17 illustrates an extension to the example shown in FIG. 12, with degrees of freedom added to the 3D object model.

FIG. 17 illustrates a rigged 3D object model applied to the example from FIG. 12. The static 3D object model 1102a is rigged to generate a rigged 3D object model 1701, with degrees of freedom added for the possible motion of the character's joints. For example, degree of freedom 1702 represents potential tilting of the neck. In frame 1041a, the value 1703 for this neck tilt is calculated. This value may be set manually by an operator to align the model parts with the image or as discussed above it may be determined automatically using for example feature tracking of features for the individual model parts.

Figure 18:
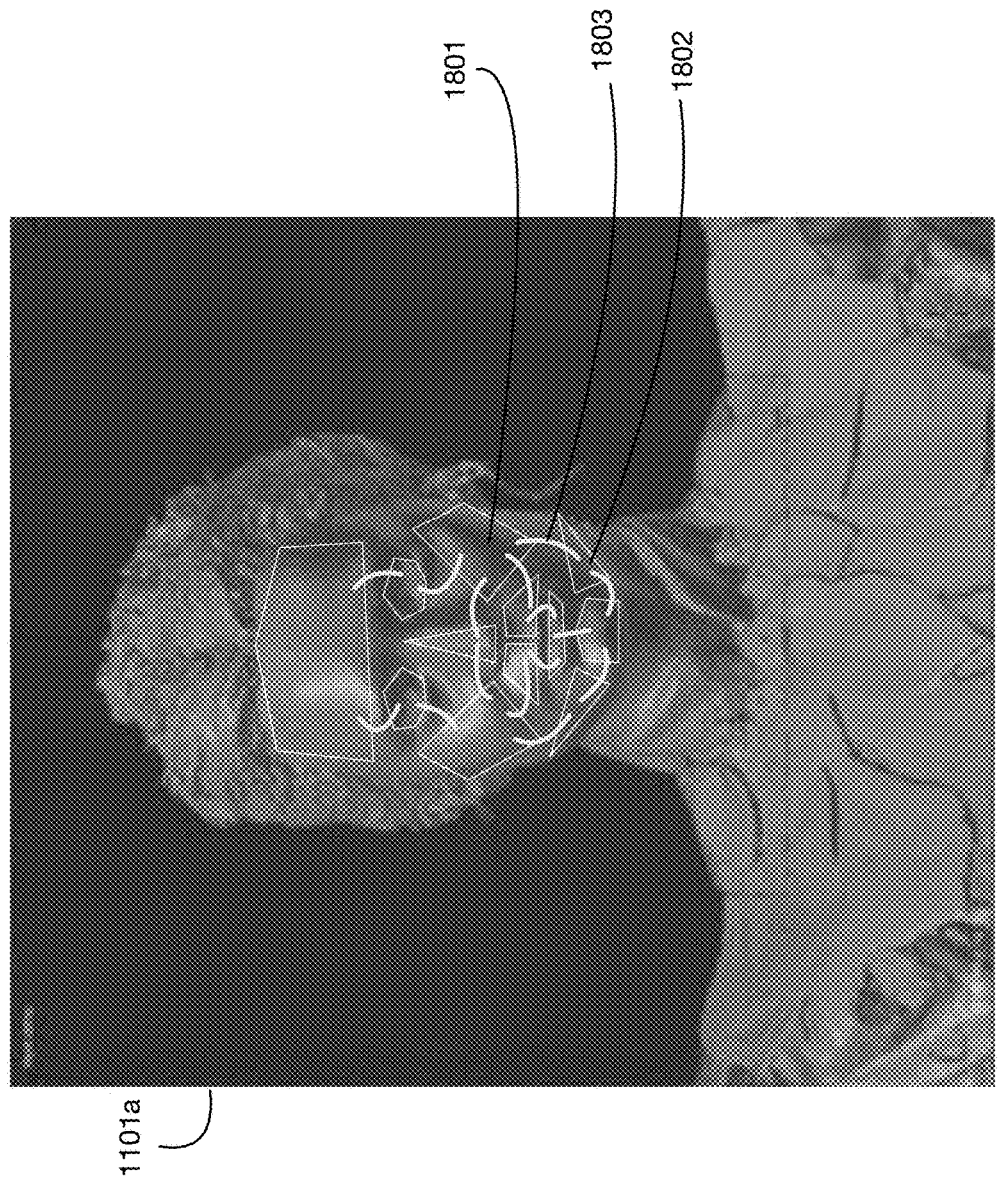
FIG. 18 illustrates an example of converting 3D scanner data to a planar model using planes fit to the points and links between the planes for constraints on plane boundaries.

In converting 3D scan data to a 3D object model, one or more embodiments may fit one or more planes to the scan data using any or all of the techniques described above. FIG. 18 illustrates an example of an embodiment that generates planes to fit 3D scan data 1101a. For example, plane 1801 is fit to the cheek, plane 1802 is fit to the jaw, and a link 1803 is defined between these two planes. The link may for example define minimum and maximum distances or angles, or a spring constant. Planes may be fit automatically to the data using constraints defined by the links. After the initial fit, the edges, angles, or normal of the planes may for example be adjusted to fit the edges or corners of the planes with one another to eliminate gaps or misalignments in the resulting 3D object model.

Figure 19:
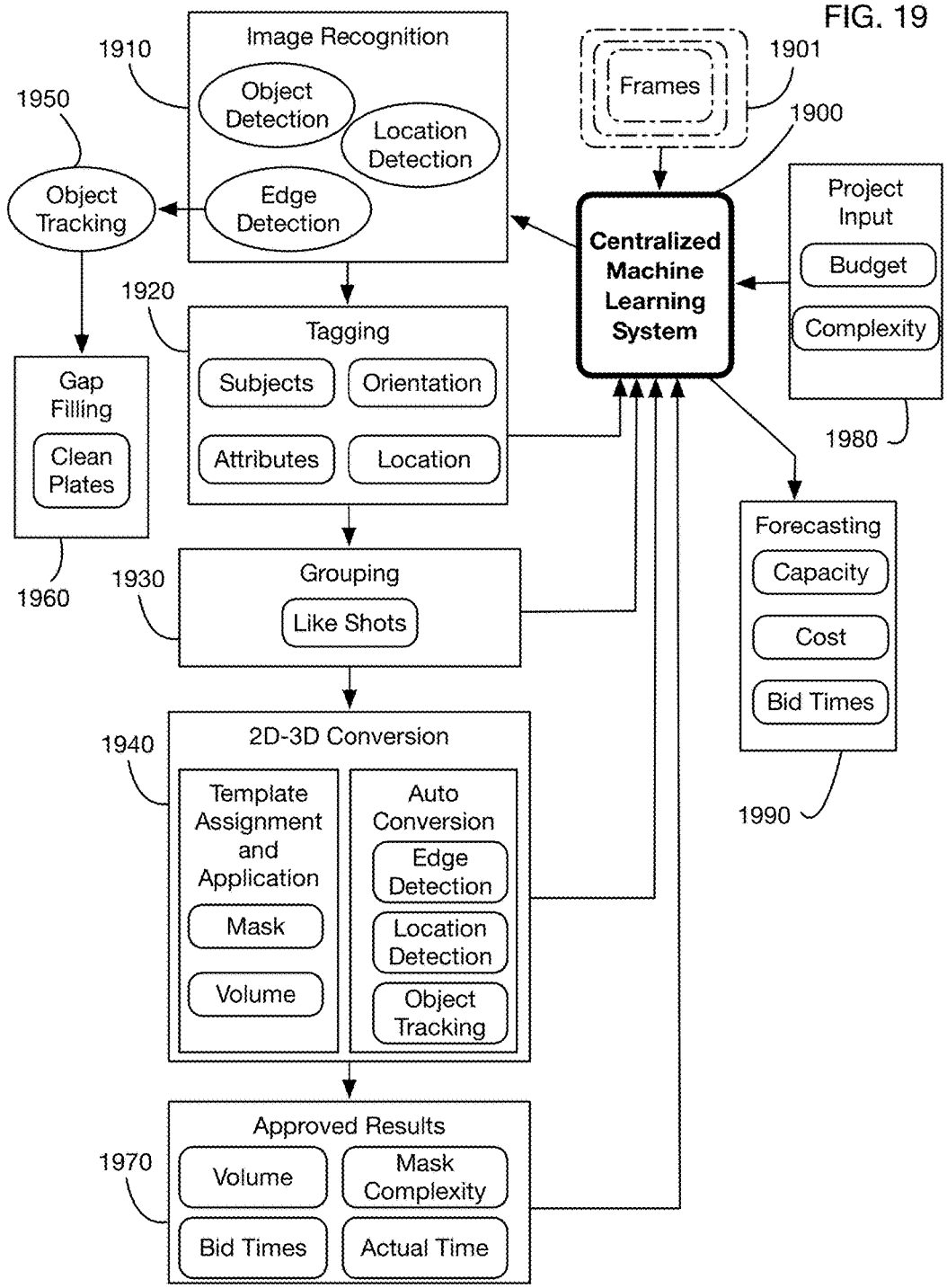
FIG. 19 shows an architectural diagram of a centralized machine learning system that performs multiple steps of a 2D to 3D conversion process, either fully automatically or semi-automatically with user input and review.

One or more embodiments may use machine learning to execute any or all conversion steps in converting a 2D video to a 3D video. In the art, these steps for 2D to 3D conversion are often performed manually, sometimes with assistance from specialized tools. One or more embodiments of the invention enable a method for performing one or more of these steps using a machine learning system. This system may dramatically reduce the time and cost of 2D to 3D conversion. A machine learning system may also be used to track complexity, costs, budgets, status, capacity, and workload, and to forecast these variables for projects or tasks. FIG. 19 shows an architectural overview of an embodiment of the system that uses a machine learning system to perform and coordinate various tasks associated with 2D to 3D conversion. The centralized machine learning system 1900 coordinates the flow of information throughout the process. It may access data from previous conversion projects to develop and refine machine learning algorithms to perform the conversion steps. The steps may be performed fully automatically by machine learning system 1900, or operators may assist with review and revisions. 2D video frames 1901 are provided to the machine learning system 1900; the system then executes a series of steps to convert from 2D to 3D. Outputs of each step are fed back into the machine learning system for possible checking, correction, refinement, and adaptive tuning of the conversion algorithms. The steps shown in FIG. 19 are illustrative; one or more embodiments may use a machine learning system to perform additional conversion steps, or to perform steps in a different order. Image Recognition process 1910 identifies objects and components within the 2D frames 1901. This process may for example use pattern recognition, known object templates, known object features, or classifiers to determine the objects that are present in a frame. The Image Recognition process may also determine the location and the edges for each detected object. The subsequent Tagging process 1920 assigns identities to the subjects recognized by the Image Recognition process 1910. For example, the Tagging process may identify specific actors, or objects associated with broad categories of objects such as people, animals, vehicles, or buildings. The Tagging process may also assign one or more attributes to each identified object. Grouping step 1930 may combine similar frames or similar shots, for example based on the frames or shots having similar objects within the frames. 2D-3D Conversion Step 1940 generates 3D stereo image pairs from the 2D Frames 1901. For example, this step may assign or create masks for the objects identified in Image Recognition step 1910 and tagged in Tagging step 1920. It may also apply depth to the masked areas, using known depth models for specific types of objects or using machine learning algorithms developed from previous conversions. The results 1970 include the stereo image pair outputs, as well as statistics for the conversion process such as complexity of the masks used and the time needed to perform the conversions. All outputs from steps such as 1910, 1920, 1930, 1940, and 1970 may be fed back into Machine Learning System 1900 for revision, correction, validation, or refinement. These feedback processes also allow the system to develop adaptive algorithms that learn from previous conversion examples.

Generation of stereo images by 2D-3D Conversion process 1940 may in some cases create gaps in images as objects are shifted left and right based on depth. The Machine Learning System 1900 may perform Gap Filling 1960 to fill these gaps. For example, the system may generate Clean Plate images that contain background elements only, and extract pixels from the Clean Plate to fill the gaps. Clean Plates may be generated for example using Object Tracking 1950, which allows the system to identify moving objects and to separate stationary objects from moving objects in each frame.

Centralized Machine Learning System 1900 may also perform project planning, budgeting, tracking, and forecasting. For example, users may input preliminary estimates for budgets and project complexity 1980. As the conversion process proceeds, the system may generate and update forecasts 1990 for project variables, such as for example required capacity, costs, and bid times.

Figure 20:
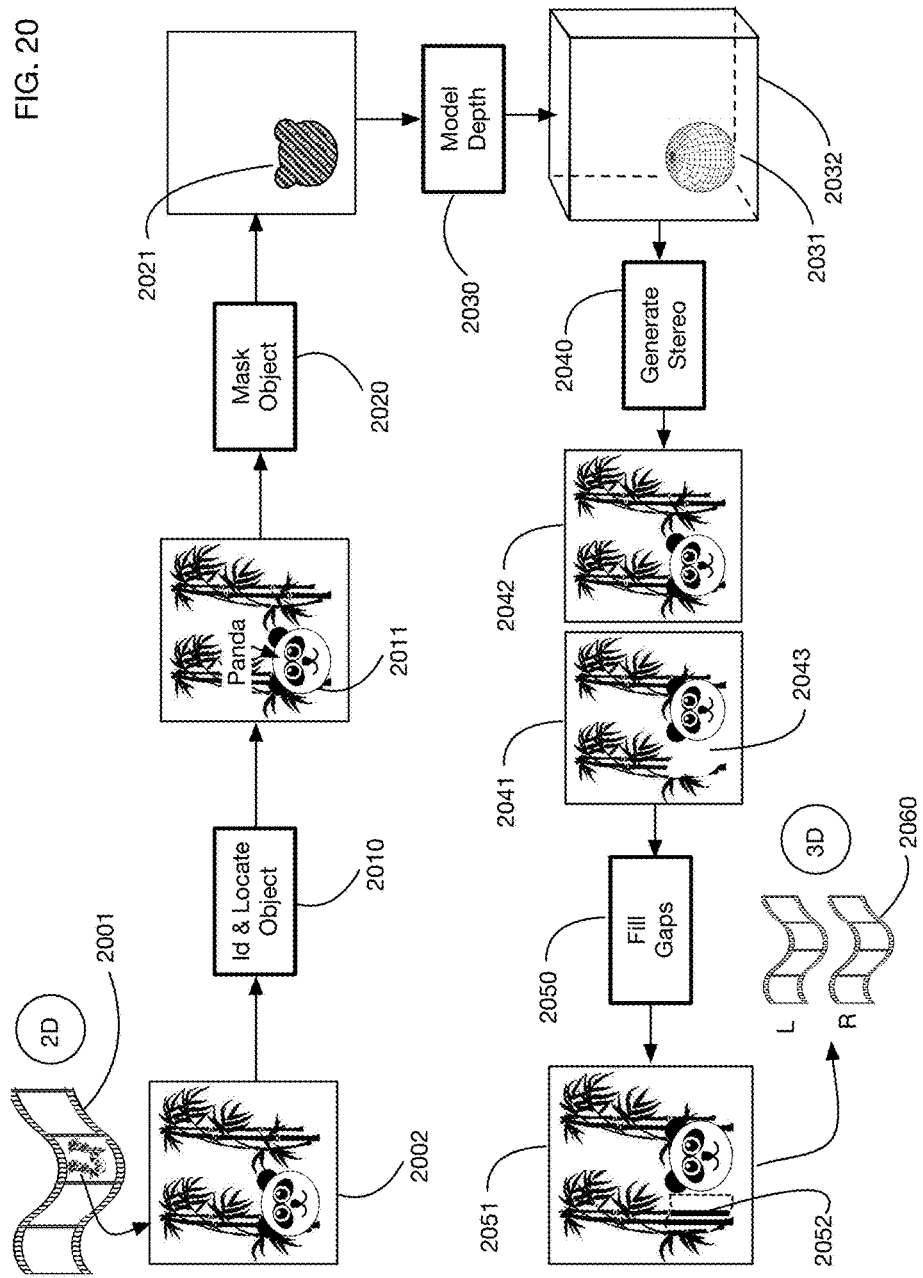
FIG. 20 illustrates selected 2D to 3D conversion steps from FIG. 19, some or all of which may be performed by a machine learning system in one or more embodiments.

FIG. 20 shows illustrative 2D to 3D conversion steps that may for example be performed fully or partially by a Machine Learning System such as the system shown in FIG. 19. These steps are illustrative; one or more embodiments may use any subset or any superset of these steps to convert any 2D image or 2D video into 3D. 2D video 2001 is an input into the conversion process. This video comprises one or more 2D frames, such as frame 2002. Step 2010 identifies and locates one or more objects in one or more of these frames. For example, object 2011 is located and identified in frame 2002. The following step 2020 masks the object (or objects). For example, rotoscoping is a technique known in the art for masking objects. The resulting object mask 2021 identifies the pixels in the frame 2002 that comprise the image of the object 2011. Binary masks are typically used in the art to represent object masks; one or more embodiments may use any type of mask. The following step 2030 models the depth of the masked object or objects. This step creates a 3D model or a depth map that indicates how far away each pixel within the mask is from the viewer. In the illustrative example of FIG. 20, the object 2011 is modeled as a sphere 2031 within 3D space 2032. One or more embodiments may use any geometric model or models to represent the depth or 3D shape of an object. Once depth has been assigned to the objects in a frame, step 2040 generates a stereoscopic image pair 2041 and 2042 for the left and right eyes of a viewer. Techniques for generating stereo image pairs from 2D images with depth maps or depth models are known in the art; one or more embodiments may use any of these techniques to perform step 2040. Typically, pixels are shifted horizontally between left and right images, with the amount of shifting inversely proportional to the depth of the pixel from the viewer. Often this process will reveal portions of an image that were occluded by the objects being shifted, resulting in missing pixels in the left or right images. For example, in left image 2041, the object 2011 has been shifted to the right, leaving a gap 2043 with missing pixels. Step 2050 fills the gaps (if any) created by pixel shifting. For example, image 2051 has pixels 2052 inserted into the gap area 2043. Techniques for gap filling are known in the art; one or more embodiments may use any of these techniques to create values for missing pixels. The complete stereo image pair with gaps filled then becomes a 3D frame in 3D video 2060, which is an output of the conversion process.

Figure 21:
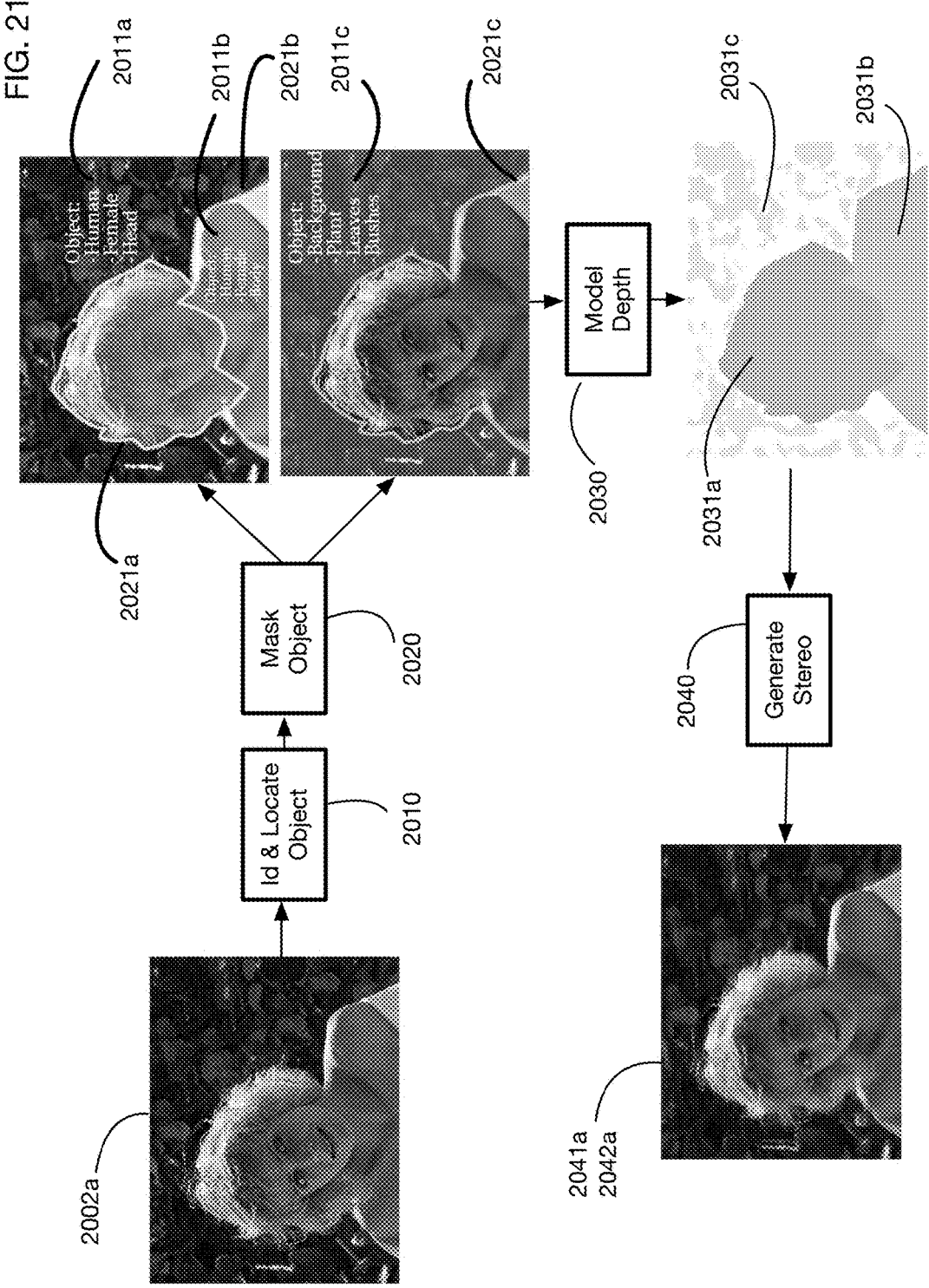
FIG. 21 shows an example of 2D to 3D conversion using a machine learning system.

FIG. 21 shows an example of the steps of FIG. 20 applied to a frame. These steps may be performed fully or partially by a machine learning system, using for example the techniques described in the following sections. Frame 2002a is a 2D frame. Steps 2010 and 2020 locate, identify, and mask objects in the frame 2002a. For example, the head of the actor is identified with tags 2011a and is masked with mask boundary 2021a; the body of the actor is identified with tags 2011b and is masked with mask boundary 2021b; and the background is identified with tags 2011c and is masked with mask boundary 2021c. The Model Depth step 2030 then assigns depth to the pixels in each of the masked regions corresponding to the identified objects. In this illustrative example depths are represented as grayscale values with darker values being closer to the viewer. The head object has depth values 2031a; the body object has depth values 2031b; and the background object has depth values 2031c. Note that the depth values of the background are not uniform; since the Id & Locate Object process 2010 tagged the background as comprising "leaves" and "bushes" the system may apply a non-uniform depth to this object to reflect the natural depth variations associated with this type of object. The Generate Stereo step 2040 then creates a stereoscopic image pair 2041a and 2042a (here shown as an anaglyph image) using the depth values 2031a, 2031b, and 2031c.

Figure 22:
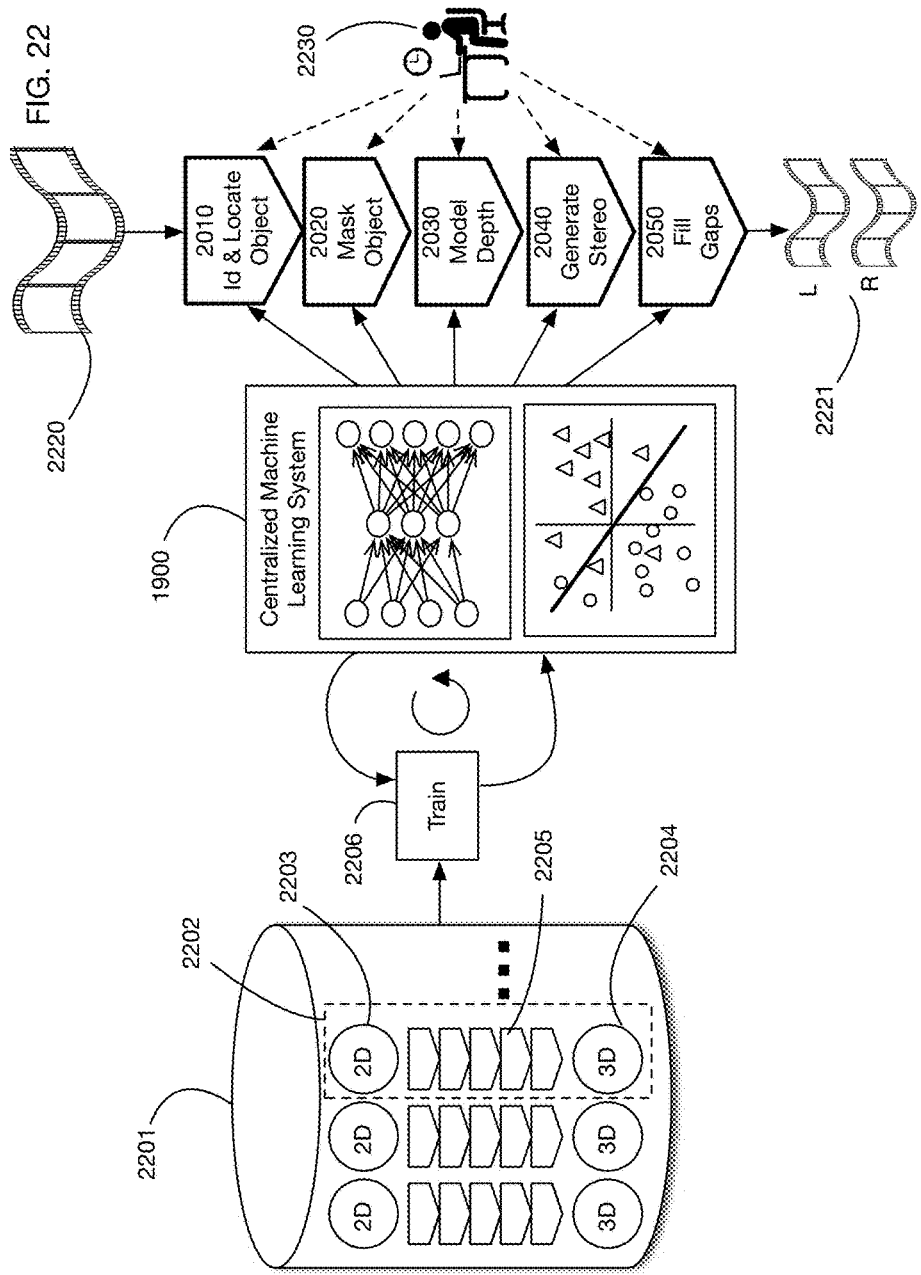
FIG. 22 illustrates an architecture of a machine learning system that develops 2D to 3D conversion methods using a training set of conversion examples.

FIG. 22 shows an embodiment of a machine learning system that develops and improves 2D to 3D conversion algorithms by training the system on conversion examples. A training set 2201 of 2D to 3D conversion examples is used to train machine learning system 1900. The training set comprises a (potentially very large) set of conversion examples such as conversion example 2202. A conversion example may include a 2D input 2203, a 3D output 2204, and data representing one or more conversion steps 2205. For example, conversion examples may include any or all of the conversion steps described in FIG. 19 or FIG. 20, or illustrated in the example of FIG. 21. Conversion examples may also include any other conversion steps, preprocessing steps, or post-processing steps. One or more embodiments may use any format for describing the inputs, transformations, and outputs of any conversion step. The training process 2206 may be iterative, with the machine learning system 1900 updated and refined at each iteration to improve its performance on the training set. As is known in the art, one or more embodiments may also use a test set and a validation set to assist with training, tuning, and selection of the machine learning system 1900.

Machine learning systems and methods for training these systems are known in the art. One or more embodiments may use any of these machine learning techniques to design and train machine learning system 1900. For example, without limitation, machine learning system 1900 may include neural networks, deep learning systems, support vector machines, regression models, classifiers, decision trees, ensembles, genetic algorithms, hidden Markov models, and probabilistic models. One or more embodiments may use supervised learning, unsupervised learning, semi-supervised learning, deep learning, or combinations thereof. One or more embodiments may preprocess training data in any desired manner, for example using feature vector selection, dimensionality reduction, or clustering. One or more embodiments may use any optimization technique or techniques to select and refine parameters for the machine learning system.

After machine learning system 1900 is trained, it may be applied to convert a 2D video 2220 to a 3D video 2221. The conversion steps may include, for example, without limitation, any or all of the steps 2010, 2020, 2030, 2040, and 2050 described in FIG. 20. The steps may also include, without limitation, any or all of the steps 1910, 1920, 1930, 1940, 1950, and 1960 described in FIG. 19. One or more embodiments may apply machine learning system 1900 to any or all of these conversion steps, and to any additional conversion steps. The machine learning system may perform any step completely, or partially. In one or more embodiments an operator 2230 may manually perform selected steps, or the operator may modify, check, revise, or complete selected steps that have been performed by machine learning system 1900. In one or more embodiments the machine learning system 1900 and the operator 2230 may interact to perform, review, or modify any or all of the 2D to 3D conversion steps. The steps may be performed in any order, and may be iterative. One or more steps may be optional. One or more steps may be performed multiple times; for example, object masking may be performed for multiple objects within a scene.

We now describe embodiments of a machine learning system applied to the steps 2020 (Mask Object), 2030 (Model Depth), and 2050 (Fill Gaps). These embodiments are illustrative; one or more embodiments may use any machine learning techniques applied to any or all of the steps required to convert a 2D video to a 3D video. Machine learning techniques to learn any desired function from an input space to an output space are known in the art. The discussion below therefore describes illustrative representations for the inputs and outputs of the 2D to 3D conversion steps. Well-known machine learning techniques may be used to train a machine learning system using a set of training examples comprising these inputs and outputs.

Figure 23:
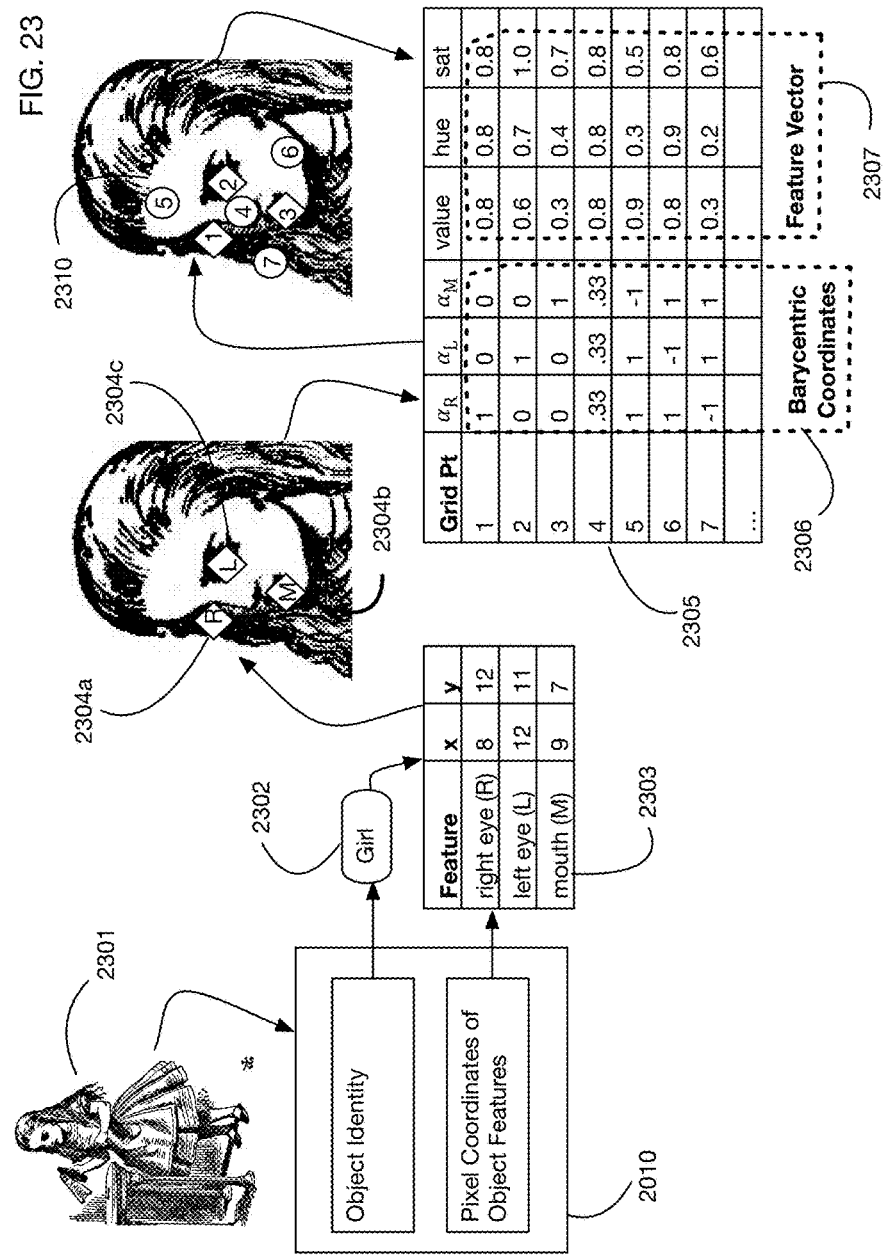
FIG. 23 illustrates feature vector extraction for a machine learning method to perform object masking.

FIG. 23 illustrates an embodiment that uses machine learning to mask an object. An initial object identification and location step 2010 is first performed on 2D frame 2301; this step may be performed manually, using a machine learning method, using image processing and pattern recognition techniques known in the art, or using any combination of these methods. In this example, the frame has been analyzed and an identity 2302 of an object in the frame has been calculated or obtained. One or more embodiments may use any desired granularity for object identities. For example, object identity 2302 could be more general, such as "human," or more specific, such as "Alice." Based on the object identity, a set of object features 2303 is associated with the object. These features may for example correspond to specific identifiable locations within an image of the object. Step 2010 selects these features based on the object identity 2302, and locates the pixel coordinates of each feature in frame 2301. Different features may be selected for different object identities. For example, an object type of "cat" might have an associated "tail" feature, while an object type of "truck" might have an associated "left front wheel" feature.

In the illustrative embodiment of FIG. 23, the feature points 2304*a*, 2304*b*, and 2304*c* are used to create a larger grid of points 2305, which is then used to generate an object mask. This approach is illustrative; one or more embodiments may use any method to train a machine learning system to generate an object mask for an identified object. In this example the points 2304*a*, 2304*b*, and 2304*c* are used as vertex points for a barycentric coordinate system; additional points are generated using barycentric coordinates 2306. This approach generates a grid of points surrounding the feature points identified in step 2010. The pixel values for these grid points form a feature vector 2307. In this example the pixel values are expressed in HSV color space; one or more embodiments may use any desired color or grayscale space to represent pixel values. The feature vector 2307 serves as an illustrative input for the Mask Object function of the machine learning system.

FIG. 24 continues the example of FIG. 23, and shows an illustrative output for the Mask Object process 2020. In this example, an object mask is represented as a sequence 2401 of connected Bézier curves that form a boundary for the masked region. This is an illustrative example; one or more embodiments may use any desired representation for a masked region, including for example using curves or segments of any shape and parameterization. The curves illustrated in 2401 are second order curves; each curve is defined by three control points. One or more embodiments may use curves of any order to represent a region boundary. For example, curve 2402 is defined by the three control points 2403*a*, 2403*b*, and 2403*c*. The coordinates of all control points 2404 comprises the output of the Mask Object process 2020. With well-defined representations for both the input Feature Vector 2307, and the Output Vector 2404, the machine learning system can be trained to reproduce the Mask Object function 2020 from the sequence of training examples comprising input and output pairs for this step.

FIG. 25 continues the example of FIG. 24 to illustrate an approach to using machine learning for the Model Depth step 2030. This step generates a depth model for a masked object region. The illustrative input for this step shown in FIG. 25 is Feature Vector 2501, which includes pixel values at the grid points 2305 and at points on the boundary curves of the masked region as calculated in FIG. 24. For example, the points on the boundary curves may comprise the endpoints of each curve together with intermediate points on each curve between the endpoints. The combined grid 2502 provides an illustrative sampling of the image across the masked region. The Feature Vector 2501 comprises the pixel values at each of these grid points. As in FIG. 23, pixel values are shown in HSV space, but one or more embodiments may use any desired pixel value representation. The output vector 2503 is the depth (z value) of each grid point, based on a 3D depth model associated with the conversion example. FIG. 25 illustrates two potential sources for these depth values. Source 2504 is for example a 3D point cloud associated with the object. This point cloud may for example be obtained from a 3D scan of the object. Interpolation of depth values between points in the point cloud may be used to generate the grid depth values 2503. Source 2505 is for example a geometric surface model generated for the object. This model may for example comprise planar or curved regions that represent the shape of the object. It may be generated by a depth artist manually or using semi-automated tools. The depth of the points in the grid 2503 may be calculated directly from the geometric model. The machine learning system may then estimate the Model Depth function 2030 from the set of training examples that comprise input Feature Vectors 2501 and Output Vectors 2503. In one or more embodiments a subsequent step may be performed to generate a depth model for all points in the masked region. For example, the grid point depths 2503 could be used to generate a triangulated surface for the entire masked region.

FIG. 26 illustrates an example of an embodiment that uses machine learning methods for the Fill Gaps step 2050. This illustrative approach uses a clean plate, which is a frame that comprises only background objects, with all foreground objects removed. Methods for generating clean plates are known in the art, but these methods typically use manual procedures. In the example of FIG. 26, a machine learning system creates a clean plate automatically by identifying and tracking moving objects, and removing these from the background of multiple frames. Frames 2601 contain a stationary background and a foreground object that moves across frames. Process 2010 identifies the moving object and locates it in at least a key frame, as described earlier. This illustrative example shows a single moving object; one or more embodiments may use similar methods to identify multiple moving objects and to track them across frames. Process 1950 tracks the object location across the frames, for example using feature tracking techniques known in the art. For example, feature 2611 corresponds to the edge of the character's mouth in the first frame; the object tracking process 1950 generates feature locations 2612, 2613, and 2614 in the subsequent frames. Using automated masking processes such as those described for FIG. 24, the pixels associated with the moving object in each frame can then be identified. Step 2620 then removes the pixels associated with the moving object from the frames, resulting in frames 2621 with just the background present. The Generate Clean Plate step 2630 then merges these background frames into clean plate 2640. Using the clean plate, the machine learning system can then automatically fill gaps such as gaps 2043 in frame 2041. The Fill Gaps process 2050 takes pixels 2641 from the clean plate 2640 to fill the area 2043, resulting in a final frame 2650 with no gaps.

As illustrated in FIGS. 23 through 26, one or more embodiments may use machine learning methods to learn and perform any or all of the steps Mask Object 2020, Model Depth 2030, and Fill Gaps 2050. These examples are illustrative. Embodiments may use machine learning for any portion or portions of the 2D to 3D conversion process. In one or more embodiments machine learning techniques may be combined with operator supervision and input to form a combined machine-human conversion system.

In one or more embodiments machine learning methods may be combined with other automated or semi-automated processes to perform a 2D to 3D conversion. For example, a 3D object model may be available for one or more objects in a 2D scene. In this case it may not be necessary or desirable to use a machine learning system to perform the Model Depth step 2030 for those objects, since the 3D object models already contain the depth values for the objects. The machine learning system may be used to model depth for other objects in a scene for which there is not 3D object model. It may also be used for other steps, such as for example the Fill Gaps step 2050.

While the invention herein disclosed has been described by means of specific embodiments and applications thereof, numerous modifications and variations could be made thereto by those skilled in the art without departing from the scope of the invention set forth in the claims.

What is claimed is:

1. A machine learning method of converting 2D video to 3D video, comprising:
    obtaining a training set comprising a plurality of conversions, each conversion comprising a 2D scene comprising one or more 2D frames;
    a corresponding 3D conversion dataset that describes conversion of said 2D scene to 3D, comprising inputs and outputs for 2D to 3D conversion steps, said 2D to 3D conversion steps comprising obtaining said one or more 2D frames;
    locating and identifying an object in one or more object frames within said one or more 2D frames, each object frame containing an image of at least a portion of said object;
    generating an object mask for said object in said one or more object frames, said object mask identifying one or more masked pixels representing said object in said one or more object frames;
    generating an object depth model that assigns a pixel depth to one or more of said one or more masked pixels;
    generating a stereoscopic image pair for each of said one or more object frames based on said object depth model, said stereoscopic image pair comprising a left image and a right image; and,
    generating one or more gap filling pixel values for one or more missing pixels in said left image or in said right image;
    training a machine learning system on said training set;
    obtaining a 2D video;
    applying said machine learning system to said 2D video to automatically perform one or more of said 2D to 3D conversion steps on said 2D video; and,
    accepting input from an operator to modify or complete one or more of said 2D to 3D conversion steps on said 2D video.

2. The method of claim 1 wherein
    said machine learning system performs said generating an object mask for said object in said one or more object frames; and,
    said corresponding 3D conversion dataset comprises
    a masking input comprising an identity of said object; and,
    a location of one or more feature points of said object in said one or more object frames; and,
    a masking output comprising a path comprising one or more segments, each segment comprising a curve defined by one or more control points, wherein said path is a boundary of said object mask.

3. The method of claim 1 wherein
    said machine learning system performs said generating an object depth model; and,
    said corresponding 3D conversion dataset comprises an object depth model input comprising said object mask; and,
    an object depth model output comprising one or more regions within said object mask; and,
    a planar or curved 3D surface associated with each of said one or more regions.

4. The method of claim 1 wherein
    said machine learning system performs said generating an object depth model; and,
    said corresponding 3D conversion dataset comprises an object depth model input comprising said object mask; and,
    an object depth model output comprising a point cloud of 3D points, each of said 3D points associated with a pixel within said object mask.

5. The method of claim 1 wherein
    said machine learning system performs said generating one or more gap filling pixel values;
    said generating one or more gap filling pixel values comprises generating a clean plate frame from one or more of said one or more 2D frames; and,
    copying pixel values from said clean plate frame to said one or more missing pixels; and,
    said corresponding 3D conversion dataset comprises a clean plate input comprising one or more of said one or more 2D frames; and,
    a clean plate output comprising said clean plate frame associated with said one or more 2D frames.

6. The method of claim 1 wherein
    said machine learning system performs said generating an object mask for said object in said one or more object frames;
    said generating an object depth model;
    said generating one or more gap filling pixel values; and,
    wherein said generating one or more gap filling pixel values comprises generating a clean plate frame from one or more of said one or more 2D frames; and,
    copying pixel values from said clean plate frame to said one or more missing pixels; and,
    said corresponding 3D conversion dataset comprises a masking input comprising an identity of said object; and,
    a location of one or more feature points of said object in said one or more object frames;
    a masking output comprising a path comprising one or more segments, each segment comprising a curve defined by one or more control points, wherein said path is a boundary of said object mask;
    an object depth model input comprising said object mask;
    an object depth model output comprising one or more of a region model comprising one or more regions within said object mask;
    a planar or curved 3D surface associated with each of said one or more regions; and,
    a point cloud of 3D points, each of said 3D points associated with a pixel within said object mask;
    a clean plate input comprising one or more of said one or more 2D frames; and,
    a clean plate output comprising said clean plate frame associated with said one or more 2D frames.

7. The method of claim 1, wherein
    said generating an object mask for said object in said one or more object frames comprises defining a 3D space associated with said one or more object frames;
    obtaining a 3D object model of said object; and,
    defining a position and orientation of said 3D object model in said 3D space that aligns said 3D object model with said image of at least a portion of said object in said one or more object frames; and, said assigns a pixel depth to one or more of said one or more masked pixels comprises associates a point in said 3D object model in said 3D space with each masked pixel; and, assigns a depth of said point in said 3D space to said pixel depth for the associated masked pixel.

8. The method of claim 7, wherein said obtaining a 3D object model of said object comprises obtaining 3D scanner data captured from said object; and, converting said 3D scanner data into said 3D object model.

9. The method of claim 8, wherein said obtaining said 3D scanner data comprises obtaining data from a time-of-flight system or a light-field system.

10. The method of claim 8, wherein said obtaining said 3D scanner data comprises obtaining data from a triangulation system.

11. The method of claim 8, wherein said converting said 3D scanner data into said 3D object model comprises retopologizing said 3D scanner data to form said 3D object model from a reduced number of polygons or parameterized surfaces.

12. The method of claim 7, further comprising dividing said 3D object model into object parts, wherein said object parts may have motion relative to one another;

augmenting said 3D object model with one or more degrees of freedom that reflect said motion relative to one another of said object parts; and, determining values of each of said one or more degrees of freedom that align said image of said at least a portion of said object in a plurality of frames of said one or more object frames with said 3D object model modified by said values of said one or more degrees of freedom.

13. The method of claim 12, wherein said determining values of each of said one or more degrees of freedom comprises selecting one or more features in each of said object parts, each having coordinates in said 3D object model;

determining pixel locations of said one or more features in said one or more object frames; and, calculating a position and orientation of one of said object parts and calculating said values of each of said one or more degrees of freedom to align a projection of said coordinates in said 3D model onto a camera plane with said pixel locations in said one or more object frames.

14. The method of claim 13, wherein said determining pixel locations of said one or more features in said one or more object frames comprises selecting said pixel locations in one or more key frames; and, tracking said features across one or more non-key frames using a computer.

* * * * *